(12) United States Patent
Hillaert et al.

(10) Patent No.: US 9,961,974 B2
(45) Date of Patent: May 8, 2018

(54) PROTECTIVE SYSTEM FOR LUGGAGE

(71) Applicant: Samsonite IP Holdings S.a r.l., Luxembourg (LU)

(72) Inventors: Rik Hillaert, Oudenaarde (BE); Christophe Van Rumst, Ghent (BE)

(73) Assignee: Samsonite IP Holdings S.a r.l., Luxembourg (LU)

( * ) Notice: Subject to any disclaimer, the term of this patent is extended or adjusted under 35 U.S.C. 154(b) by 382 days.

(21) Appl. No.: 14/358,167

(22) PCT Filed: Nov. 13, 2012

(86) PCT No.: PCT/EP2012/072496
§ 371 (c)(1),
(2) Date: May 14, 2014

(87) PCT Pub. No.: WO2013/072312
PCT Pub. Date: May 23, 2013

(65) Prior Publication Data
US 2014/0311847 A1 Oct. 23, 2014

Related U.S. Application Data
(60) Provisional application No. 61/559,395, filed on Nov. 14, 2011.

(51) Int. Cl.
*A45C 5/03* (2006.01)
*A45C 5/14* (2006.01)
(Continued)

(52) U.S. Cl.
CPC .................. *A45C 5/03* (2013.01); *A45C 5/14* (2013.01); *A45C 13/36* (2013.01); *B60B 33/045* (2013.01);
(Continued)

(58) Field of Classification Search
CPC .. A45C 5/03; A45C 5/14; A45C 13/36; A45C 2005/148; B60B 33/045;
(Continued)

(56) References Cited

U.S. PATENT DOCUMENTS 163,863 A * 6/1875 Geer ..................... B60B 33/045
16/40
1,818,525 A * 8/1931 Perez ..................... A47B 61/06
190/3
(Continued)

FOREIGN PATENT DOCUMENTS

CN 85106622 A 3/1987
CN 2459954 Y 11/2001
(Continued)

OTHER PUBLICATIONS

International Search Report dated Feb. 22, 2013 for International Application No. PCT/EP2012/072496, 3 pages.

*Primary Examiner* — Tri Mai
(74) *Attorney, Agent, or Firm* — Dorsey & Whitney LLP

(57) ABSTRACT

Protective systems (1000) for a luggage piece (100) may include a deformable body (1002) and a cover (1004). The cover (1004) may be configured to overlie and to be coupled with the deformable body (1002). The cover (1004) may be more rigid than the deformable body (1002). The deformable body (1002) may include an interior shape (1034) at least partially complementary to a recess (1003) formed in an exterior surface (101) of the luggage piece (100). The deformable body (1002) may be joined to the luggage piece (100) when positioned at least partially in the recess (1003). External impacts exerted on the cover (1004) may be transmitted across the cover (1004) such that the forces associated with such external impacts may be exerted on the deformable body (1002) across a larger surface area than a (Continued)

surface area of the cover (1004) receiving the external impacts and may be at least partially absorbed by the deformable body (1002).

22 Claims, 15 Drawing Sheets

(51) Int. Cl.
*A45C 13/36* (2006.01)
*B60B 33/04* (2006.01)

(52) U.S. Cl.
CPC ..... *A45C 2005/148* (2013.01); *B60B 2200/45* (2013.01); *B60B 2900/133* (2013.01); *B60B 2900/211* (2013.01); *B60B 2900/321* (2013.01)

(58) Field of Classification Search
CPC .......... B60B 2200/45; B60B 2900/133; B60B 2900/211; B60B 2900/321
See application file for complete search history.

(56) References Cited

U.S. PATENT DOCUMENTS

| | | | | |
|---|---|---|---|---|
| 2,261,605 A * | 11/1941 | Smith | ............... | A47B 61/06 190/16 |
| 2,496,182 A * | 1/1950 | Sykes | ............... | A45C 13/36 190/37 |
| 2,537,669 A * | 1/1951 | Honig | ............... | A47B 67/02 312/269 |
| 2,876,485 A * | 3/1959 | Cowles | ............... | A47C 7/002 16/42 R |
| 3,299,766 A * | 1/1967 | Gould | ............... | F16B 43/001 277/640 |
| 3,433,500 A * | 3/1969 | Christensen | ............ | B60B 33/00 16/47 |
| 3,768,116 A * | 10/1973 | Propst | ............... | B60B 33/0002 16/43 |
| 4,346,498 A * | 8/1982 | Welsch | ............... | B60B 33/0002 16/44 |
| 4,418,804 A * | 12/1983 | Bradley | ............... | A45C 5/14 190/127 |
| 4,803,769 A | 2/1989 | Gibbs | | |
| 5,593,461 A * | 1/1997 | Reppert | ............... | B60B 33/0002 16/21 |
| 5,782,325 A * | 7/1998 | O'Shea | ............... | A45C 5/14 16/113.1 |
| 5,992,588 A | 11/1999 | Morszeck | | |
| 6,035,982 A | 3/2000 | Wei-Chih | | |
| 6,131,713 A | 10/2000 | Sher | | |
| 6,283,261 B1 | 9/2001 | Sher | | |
| 6,315,368 B1 * | 11/2001 | Kuo | ............... | A45C 5/14 190/18 A |
| 6,357,567 B1 * | 3/2002 | Tsai | ............... | A45C 5/02 16/113.1 |
| 6,499,184 B2 * | 12/2002 | Plate | ............... | B60B 33/0002 16/18 R |
| 8,783,432 B2 * | 7/2014 | Wang | ............... | A45C 5/03 190/115 |
| 2003/0006572 A1 * | 1/2003 | Huang | ............... | A45C 5/14 280/79.11 |
| 2007/0157568 A1 | 7/2007 | Mostert | | |
| 2008/0295458 A9 | 12/2008 | Mostert | | |
| 2012/0005858 A1 * | 1/2012 | Lai | ............... | B60B 33/0007 16/45 |

FOREIGN PATENT DOCUMENTS

| | | |
|---|---|---|
| CN | 201931938 U | 8/2011 |
| EP | 0173779 A1 | 3/1986 |
| GB | 2184940 A | 7/1987 |
| GB | 2361692 A | 12/2003 |
| GB | 2477863 A | 8/2011 |
| JP | 2009262499 A | 11/2009 |
| WO | 2012069797 A1 | 5/2012 |

\* cited by examiner

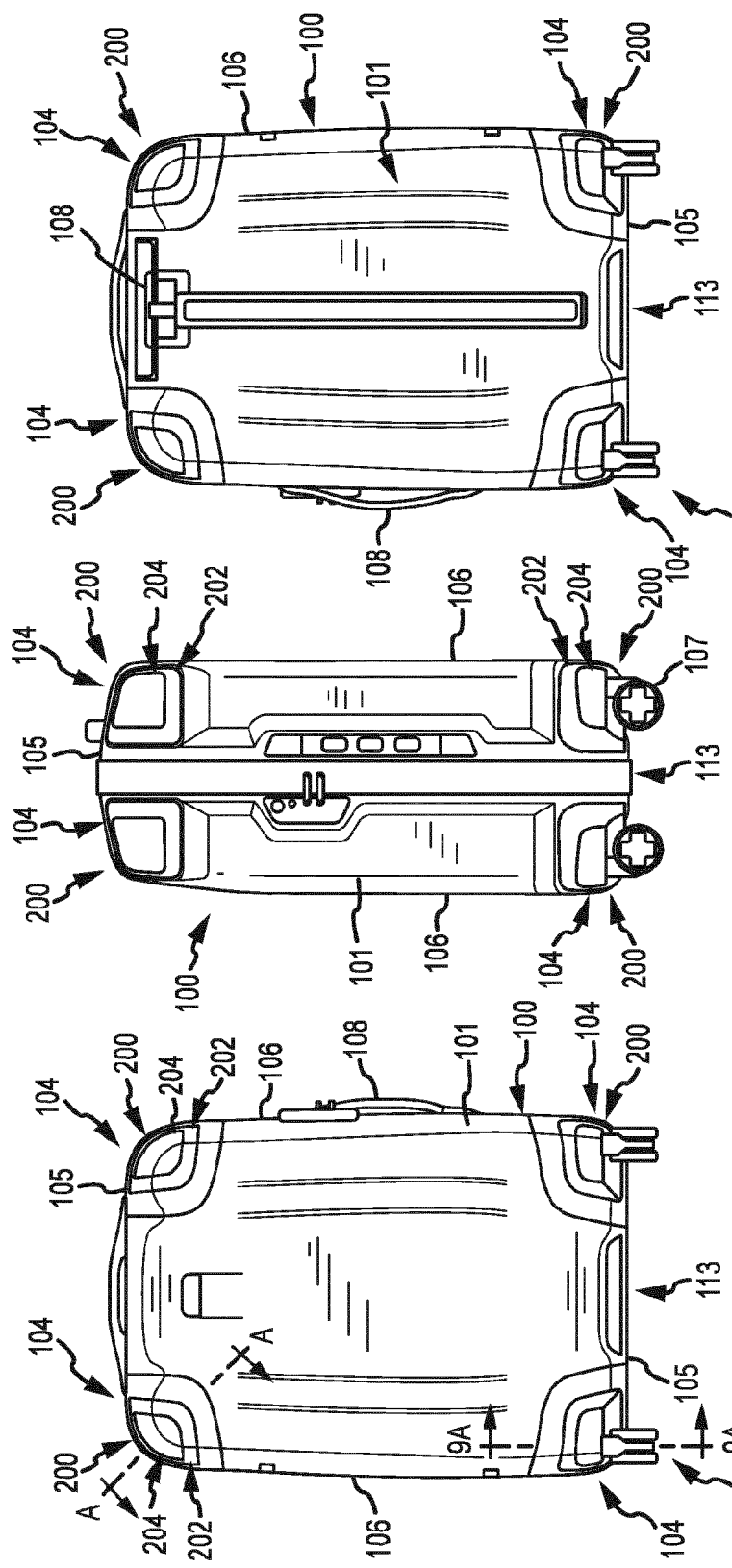

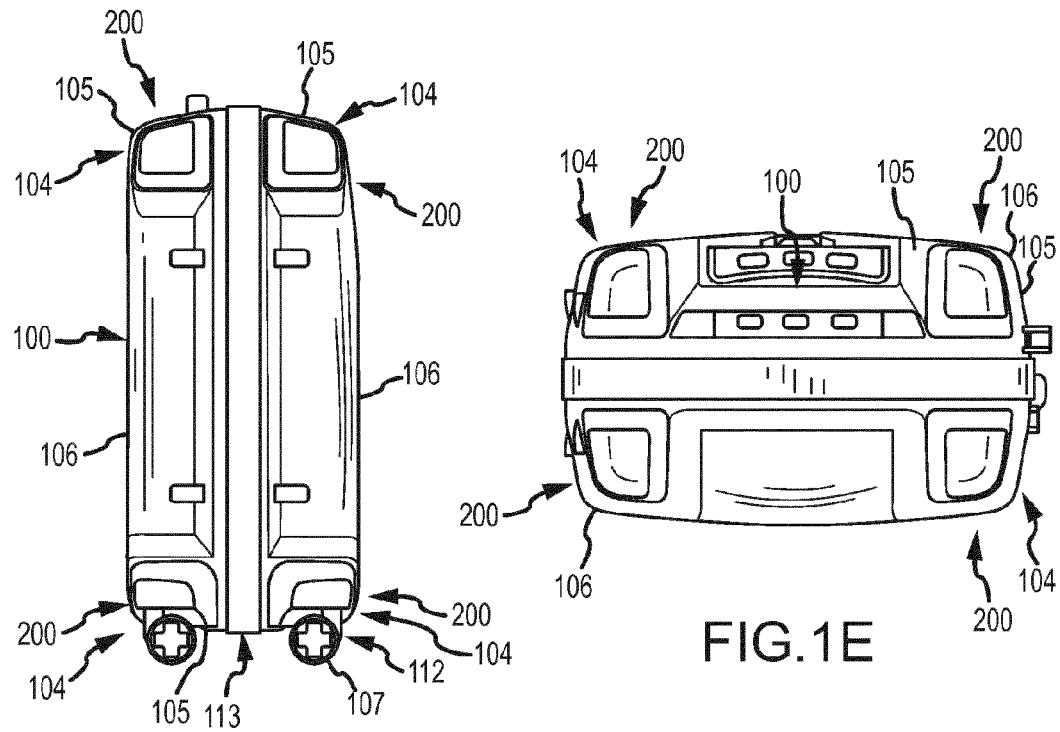
FIG.1D
FIG.1E
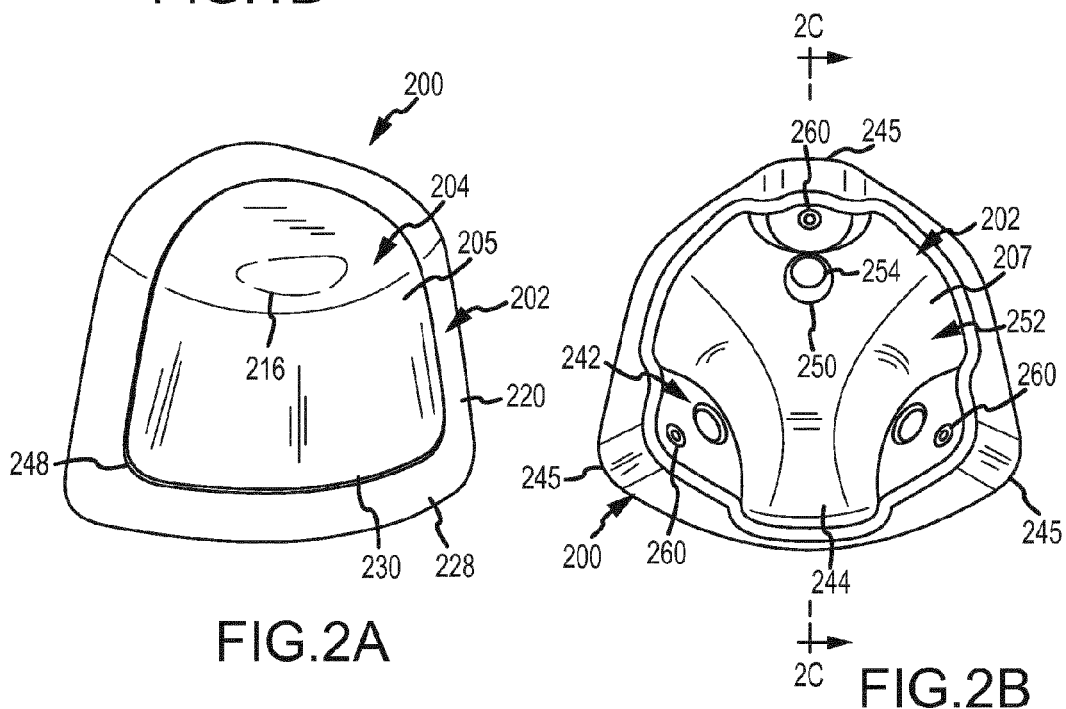
FIG.2A
FIG.2B

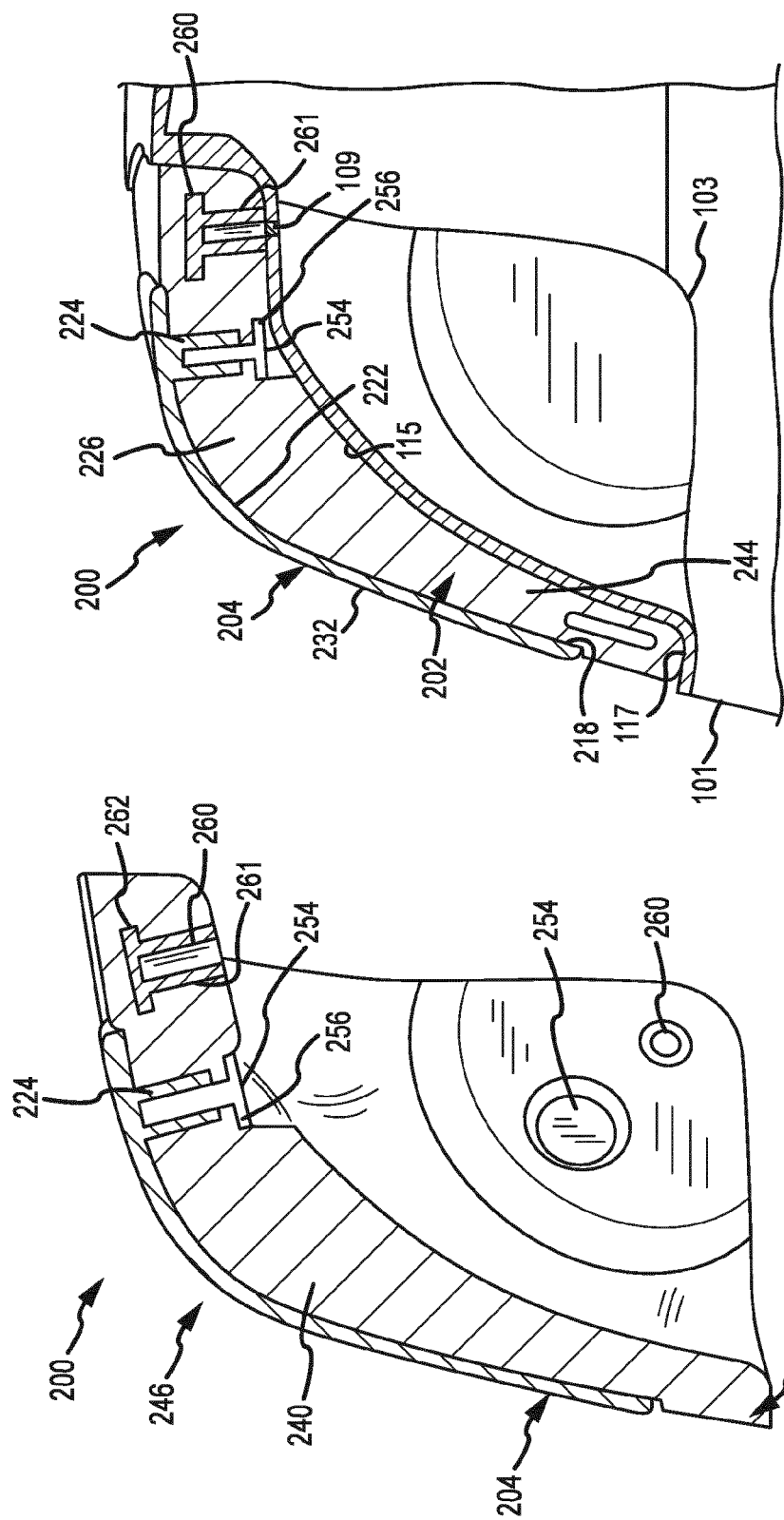

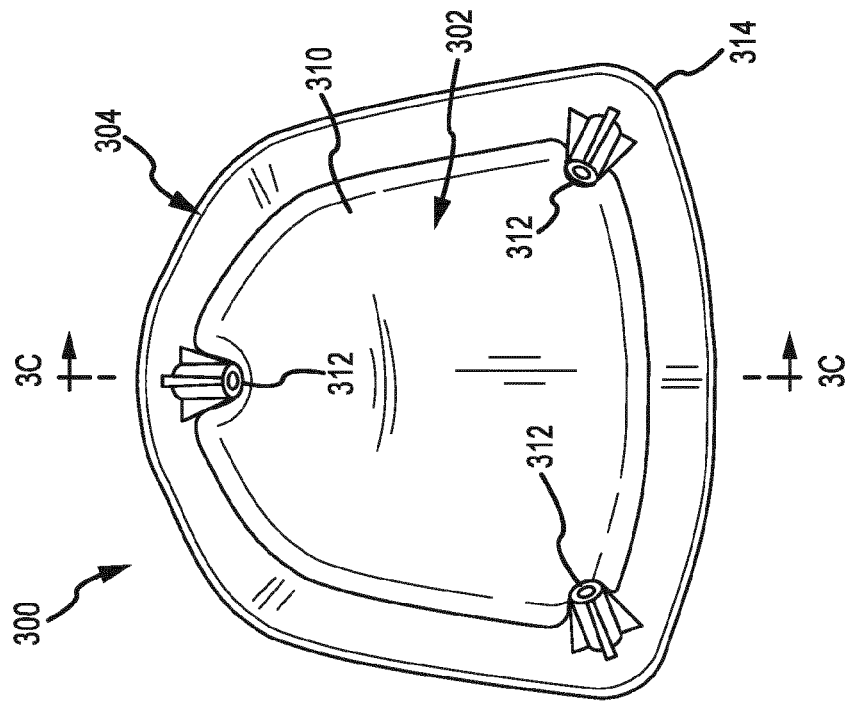
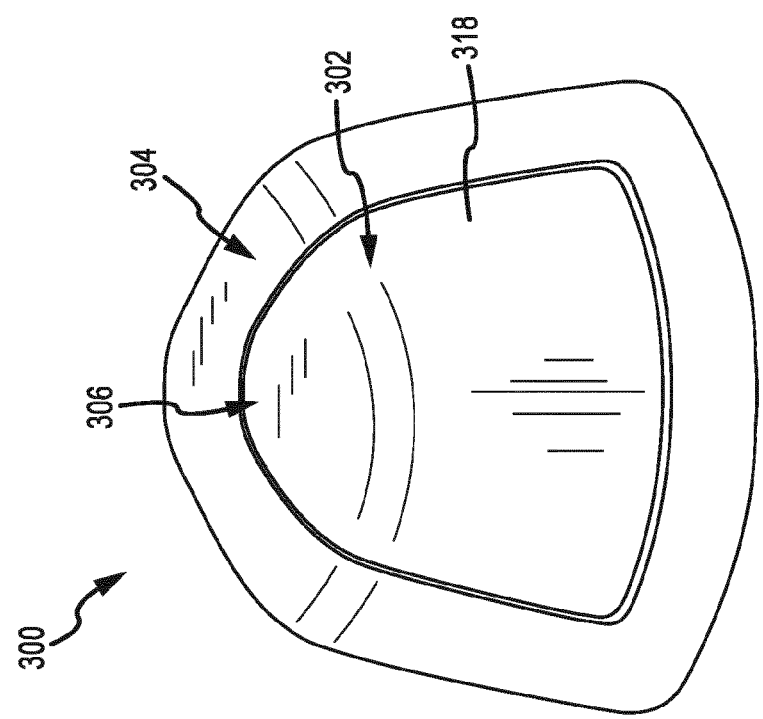

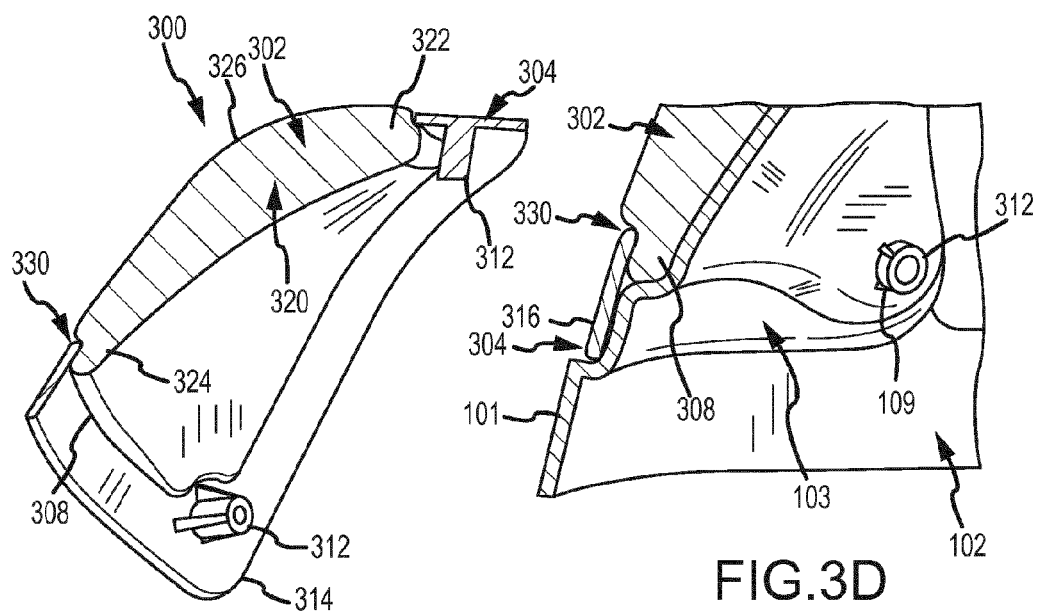
FIG.3C
FIG.3D
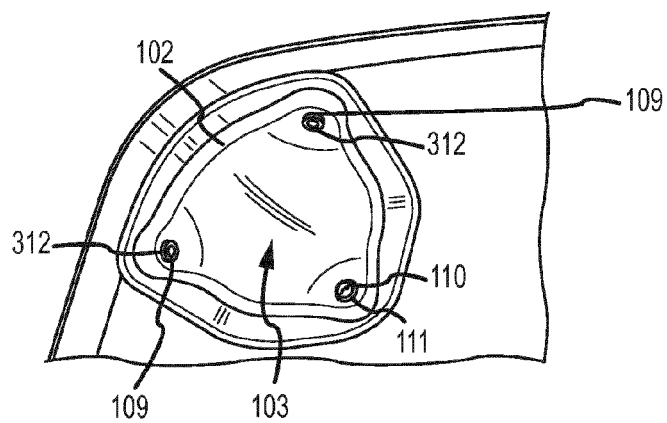
FIG.3E

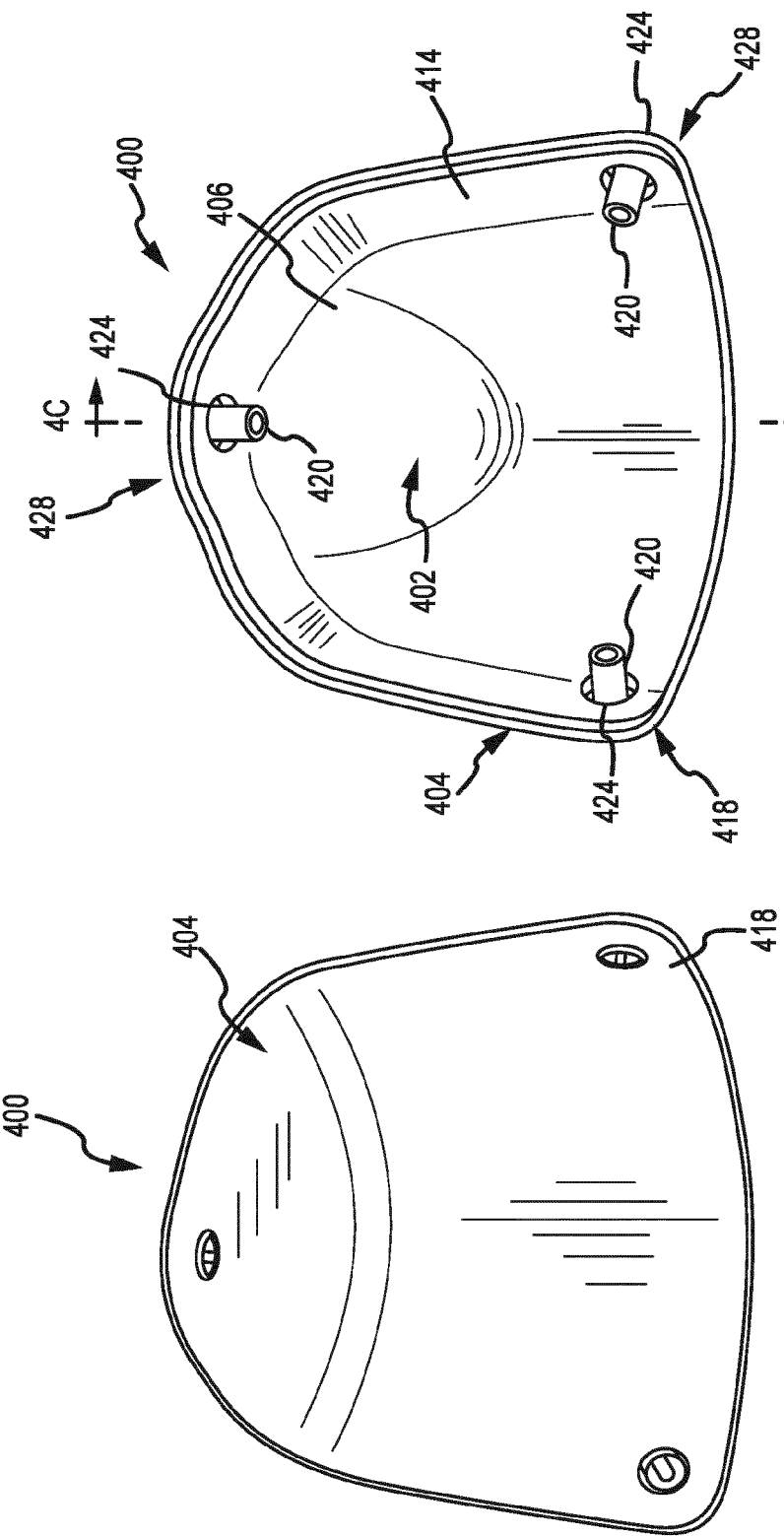

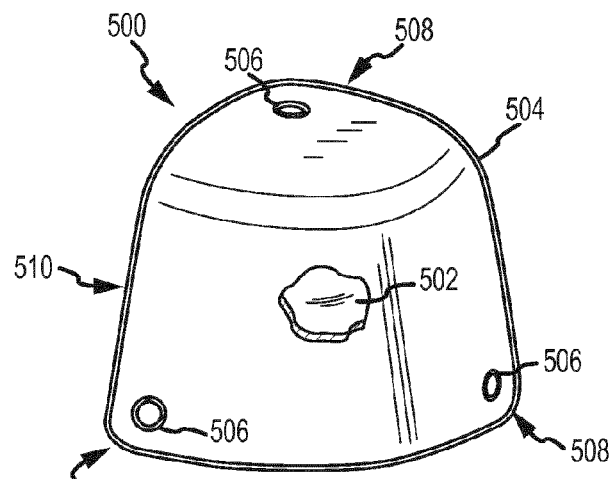
FIG.5
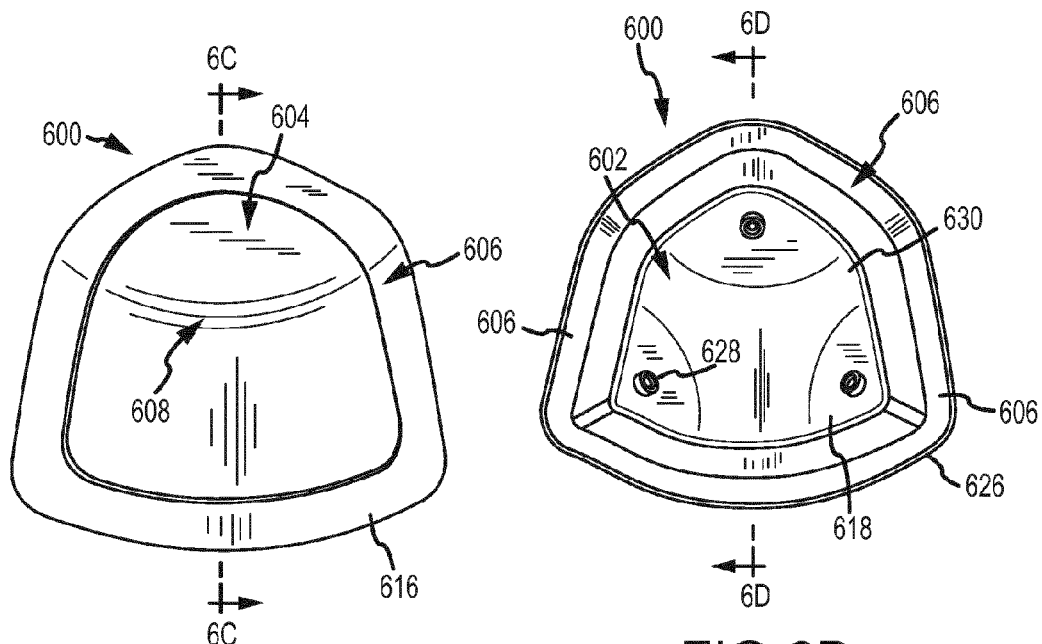
FIG.6A
FIG.6B

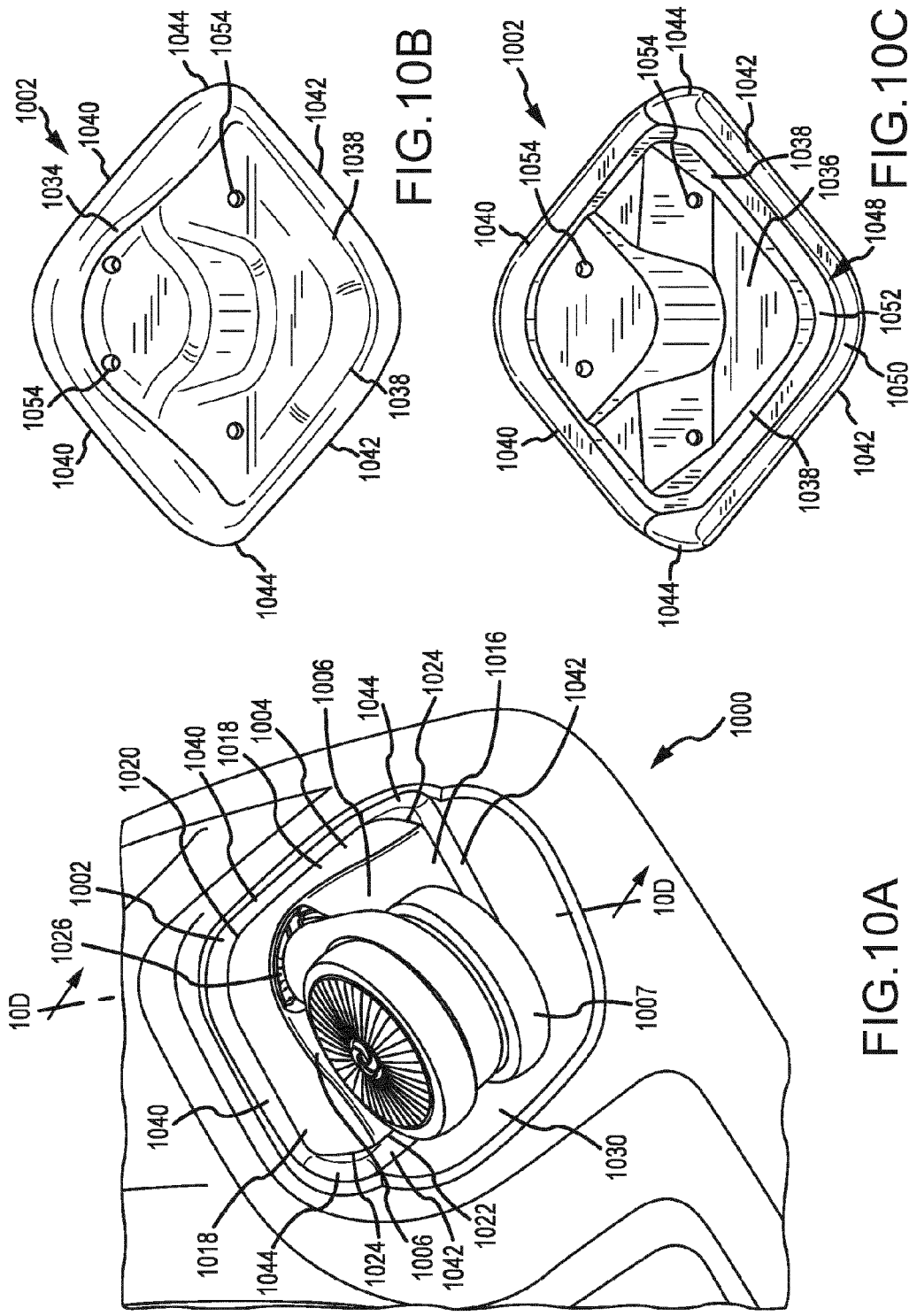

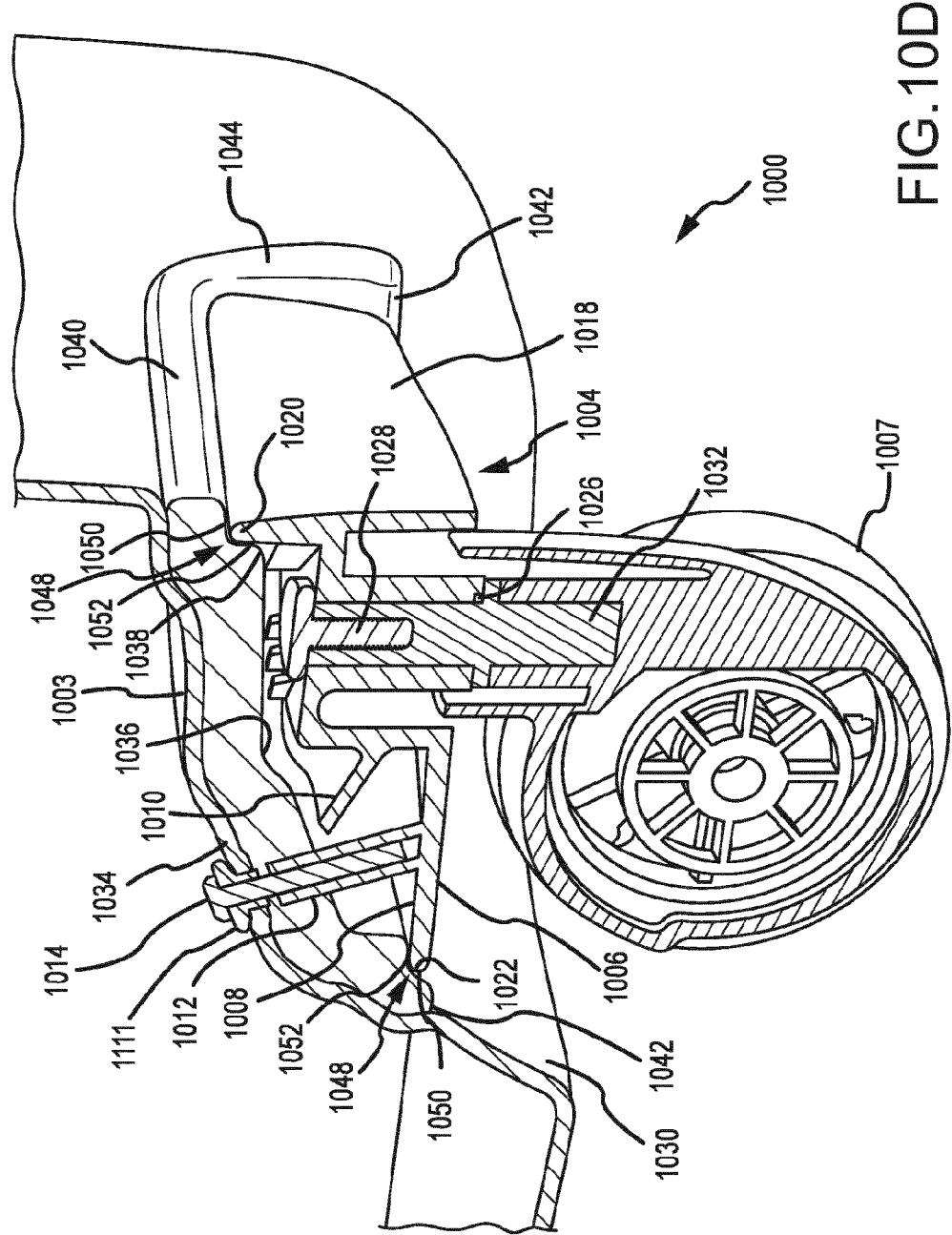

PROTECTIVE SYSTEM FOR LUGGAGE

CROSS-REFERENCE TO RELATED APPLICATIONS

This application is the U.S. national stage application of International Patent Application No. PCT/EP2012/072496 filed on Nov. 13, 2012 and entitled "Protective System for Luggage" which claims the benefit of U.S. provisional application No. 61/559,395 entitled "Protective System for Luggage" filed on Nov. 14, 2012, which are hereby incorporated by reference in their entireties.

FIELD OF INVENTION

The present invention generally relates to luggage, and more particularly to protective elements for luggage.

BACKGROUND

Luggage pieces, such as suitcases, are often used by travelers to transport items that may be fragile or breakable. To protect these items, luggage pieces may generally include reinforcement or impact absorbing structures arranged inside the main compartment of the luggage pieces for absorbing high force impacts due to loading and unloading the luggage piece on airplanes and luggage conveyors. While the reinforcement or impact absorbing structures may protect contents within a luggage piece, the exterior of the luggage piece may not be protected by the reinforcement or impact absorbing structures arranged inside the main compartment.

Documents that may be related to the present disclosure in that they include luggage corner attachments or connections include GB 2184940, GB 2361692, JP 2009262499, U.S. Pat. No. 6,131,713, U.S. Pat. No. 6,035,982 and WO 2012/069797. These proposals, however, may be improved.

It is therefore desirable to provide an improved luggage protection arrangement that addresses the above described problems and/or which more generally offers improvements or an alternative to existing arrangements.

SUMMARY

According to the present invention there is therefore provided a luggage item as described in the accompanying claims.

In particular, provided herein are protective systems for luggage for protecting both the contents within the interior of the luggage as well as at least portions of the luggage itself. The protective systems may receive impact forces at an exterior surface and may serve to both absorb and dampen the impact force. To absorb the impact forces, the protective systems may deform or deflect inwardly. To dampen the impact forces, the protective systems may distribute remaining impact forces across the protective system, which spreads the remaining impact force over a larger surface area. Impact absorption and dampening using the protective systems may reduce the chances of damage to the protective system, the luggage piece and its contents.

In some implementations, the protective systems may include a deformable body and a cover. The deformable body may include an interior shape at least partially complementary to a recess formed in an exterior surface of the luggage piece. The deformable body may be joined to the luggage piece when positioned at least partially in the recess. The cover may be configured to overlie and to be coupled with the deformable body. The cover may be more rigid than the deformable body. External impacts exerted on the cover may be transmitted across the cover such that the forces associated with such external impacts may be exerted on the deformable body across a larger surface area than a surface area of the cover receiving the external impacts and may be at least partially absorbed by the deformable body.

In some implementations, the luggage piece may include at least one corner region. The recess may be formed at the at least one corner region. A base wall of the recess may define in general a concave or convex exterior surface shape.

In some implementations, the deformable body may include at least one of a foam, a gel, a visco-elastic material or an elastic material.

In some implementations, the cover may include at least one wheel. The deformable body may absorb forces impacting the at least one wheel.

In some implementations, the protective system may absorb an amount of sound and/or vibration produced by the at least one wheel.

In some implementations, the deformable body may include an exterior shape complementary to a periphery of the cover.

In some implementations, the exterior shape of the deformable body may define a recess for receiving a peripheral edge portion of the cover.

In some implementations, the deformable body may operably form a friction fit between the recess of the exterior surface of the luggage piece and the periphery of the cover.

In some implementations, the deformable body may include at least one aperture. At least one fastener may be positioned through the at least one aperture of the deformable body. The at least one fastener may be configured to join the deformable body within the recess of the luggage piece.

In some implementations, the luggage piece may be configured with at least one aperture formed within the recess. At least one deformable boss may be configured to operably engage the at least one aperture of the luggage piece formed within the recess.

In some implementations, the at least one deformable boss may be configured to receive the at least one fastener positioned through the at least one aperture of the deformable body.

In some implementations, the at least one deformable boss may be positioned between the aperture formed in the luggage piece in the recess and the at least one fastener. The at least one deformable boss may be configured to absorb impacts transmitted from the at least one fastener.

In some implementations, the cover may further include an interior surface. The interior surface may define more than one protruding structures from an interior surface of the cover extending toward the recess of the exterior surface of the luggage piece.

In some implementations, at least one of the protruding structures may include a deformable terminal end. The deformable terminal end may be configured to be adjacent to or in contact with the exterior surface of the luggage piece and within the recess. The deformable terminal end may be configured to absorb external impacts exerted on the cover by deforming.

In some implementations, the luggage piece may include a substantially rigid outer structure. The recess may be formed in the substantially rigid outer structure.

In some implementations, the deformable body may include an exterior surface forming a recess. The cover may be received within the recess formed in the deformable body.

In some implementations, the deformable body may further include a thickness. At least one region of the deformable body may be relatively thicker than surrounding regions of the deformable body.

In some implementations, the cover may include a thin portion. External impacts exerted on the thin portion may cause the thin portion to deflect inwardly into the deformable body.

In some implementations, the deformable body may further include a central region having a relatively larger thickness dimension than other regions of the deformable body. The enlarged region may be configured to underlie the thin portion of the cover.

In some implementations, the protective system may further include an outer cover layer overlaying the cover. The external impacts exerted on the outer cover layer may be transmitted across the outer cover layer such that the forces associated with the external impacts may be exerted on the cover across a larger surface area than a surface area of the other cover layer receiving the external impacts.

In some implementations, the cover may include anchors extending from an interior surface of the cover and may be configured to join with the deformable body.

In some implementations, the protective system may further include a frame surrounding the deformable body. The frame may form a connection structure for connecting the deformable body to the exterior surface of the luggage piece.

In some implementations, the frame and the deformable body may form a lap joint where engaged.

In some implementations, the protective system may further include a pliable cover overlying and coupled to the deformable body. External impacts exerted on the pliable cover may cause the pliable cover to deflect inwardly into the deformable body.

In some implementations, the pliable cover may be spray coated or over-molded on the deformable body.

In some implementations, the cover may include a rigid cover overlying and movably coupled to the deformable body. External impacts exerted on the rigid cover may be transmitted across the cover such that forces associated with the external impacts may cause the rigid cover to move along an exterior surface of the deformable body.

In some implementations, the protective system may further include at least one attachment leg joining the cover to the deformable body.

In some implementations, the attachment legs may extend from an attachment structure coupled to the deformable body.

In another implementation of a protective system for a luggage piece, the protective system may include a cover. The cover may include an exterior corner shape. The cover may further include one or more of ribs. Each of one or more ribs may form a continuous wall with a free end terminating at an indented corner region of an external surface of the luggage piece. An external force exerted on the cover may be absorbed by the cover exterior and any remaining force may be dissipated by transmitting the remaining force throughout the cover and the ribs to the indented corner region so that the remaining force may be received at the indented corner region across a larger surface area than a surface area of the cover receiving the external force.

In another implementation of a protective system for a luggage piece, the protective system may include a deformable body, a connection structure and an external force. The deformable body may include an exterior corner shape and an interior shape. The interior shape may include a complementary arrangement to an indented corner region of an exterior surface of the luggage piece. The connection structure may be configured to join the deformable body to the luggage piece at the indented corner region. An external force exerted on the deformable body may be at least partially absorbed by the deformable body and any remaining force may be dissipated by transmitting the remaining force through the deformable body such that the remaining force may be received at the indented corner region across a larger surface area than a surface area of the deformable body receiving the external force.

In some implementations, the protective system may further include a rigid covering overlying and coupled to the deformable body. External impacts exerted on the rigid covering may be transmitted across the covering such that the forces associated with such external impacts may be exerted on the deformable body across a larger surface area than a surface area of the covering receiving the external impacts.

In some implementations, the rigid covering may be received within a recess formed on an exterior surface of the deformable body. An outer region of the deformable body exterior may surround the rigid covering.

In some implementations, the deformable body may further include at least one enlarged corner region underlying the deformable body outer region.

In some implementations, the rigid covering may include a thin portion. External impacts exerted on the thin portion may cause the thin portion to deflect inwardly into the deformable body.

In some implementations, the deformable body may further include an enlarged central region having a relatively larger deformable body thickness than other regions of the deformable body. The enlarged central region may be configured to underlie the thin portion.

In some implementations, the protective system may further include another covering layer overlaying the rigid covering. The external impacts exerted on the another covering layer may be transmitted across the another covering layer such that the forces associated with the external impacts may be exerted on the rigid covering across a larger surface area than a surface area of the another covering layer receiving the external impacts.

In some implementations, the rigid covering may include anchors extending from an interior surface of the covering interior and may be configured to join with the deformable body.

In some implementations, the protective system may further include a frame surrounding the deformable body. The frame may form the connection structure for connecting the deformable body to an exterior surface of the luggage piece.

In some implementations, the frame and the deformable body may form a lap joint.

In some implementations, the protective system may further include a pliable covering overlying and coupled to the deformable body. External impacts exerted on the pliable covering may cause the pliable covering to deflect inwardly into the deformable body.

In some implementations, the pliable covering may be spray coated or overmolded on the deformable body.

In some implementations, the protective system may further include a rigid covering overlying and movably coupled to the deformable body. External impacts exerted on the rigid covering may be transmitted across the covering such that forces associated with the external impacts may cause the rigid covering to move along a deformable body exterior.

In some implementations, the protective system may further include attachment legs joining the rigid covering to the deformable body such that movement of the rigid covering may be against an elastic force of the attachment legs.

In some implementations, the attachment legs extend from an attachment structure coupled to the deformable body.

In some implementations, the connection structure may include more than one bosses and fasteners.

In some implementations, the connection structure may further include deformable bosses.

In some implementations, at least one wheel may be joined to the protective system. The deformable body may absorb and transmit forces from the at least one wheel, thereby reducing an amount of sound produced by the at least one wheel.

In some implementations, the luggage piece may include a substantially rigid shell at the indented corner region.

The various implementations of the protective systems as described herein may protect a luggage piece from damage that may be caused by undesirable external impact with its shock absorbing properties, force-dampening properties, sound dampening properties, vibration absorptive properties, or some combination thereof, thus prolonging the life time of the luggage piece.

This summary of the disclosure is given to aid understanding, and one of skill in the art will understand that each of the various aspects and features of the disclosure may advantageously be used separately in some instances, or in combination with other aspects and features of the disclosure in other instances.

BRIEF DESCRIPTION OF THE DRAWINGS

The present invention will now be described by way of example only with reference to the following figures in which:

FIGS. 1A-1E show front side, right side, back side, left side and top elevation views of a luggage piece including protective systems.

FIGS. 2A-2B show a front perspective view and a rear perspective view, respectively, of a protective system according to a first implementation.

FIG. 2C shows a cross sectional view of the first protective system of FIGS. 2A-2B, viewed along line 2C-2C in FIG. 2B.

FIG. 2D shows a partial cross-sectional view of the luggage piece of FIGS. 1A-1E, viewed along line A-A in FIG. 1 and incorporating the first protective system of FIGS. 2A-2C.

FIGS. 3A-3B show a front perspective view and a rear perspective view, respectively, of a protective system according to a second implementation.

FIG. 3C shows a cross-sectional view of the second protective system of FIGS. 3A-3B, viewed along line 3C-3C in FIG. 3B.

FIG. 3D shows a partial cross-sectional view of the luggage piece of FIGS. 1A-1E, viewed along line A-A in FIG. 1 and incorporating the second protective system of FIGS. 3A-3C.

FIG. 3E shows a partial perspective view of the luggage piece incorporating the second protective system.

FIGS. 4A-4B show a front perspective view and a rear perspective view, respectively, of a protective system according to a third implementation.

FIG. 5 shows a front view of a protective system according to a fourth implementation.

FIGS. 6A-6B show a front perspective and a rear perspective view, respectively, of a protective system according to a fifth implementation.

FIG. 10A shows a bottom perspective view of a protective system according to a ninth implementation joined to the shell of a luggage piece.

FIGS. 10B and 10C show a top perspective view and a bottom perspective view, respectively, of a deformable body of the protective system according to the ninth implementation.

FIG. 10D shows a cross-sectional view of the protective system according to the ninth implementation joined to the shell of the luggage case, viewed along line 10D-10D in FIG. 10A.

DETAILED DESCRIPTION

Figure 2E:
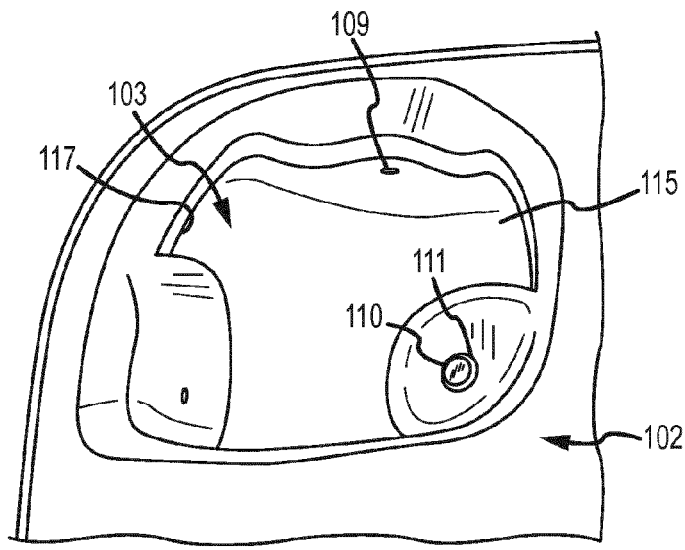
FIG. 2E shows a partial perspective view of the luggage piece incorporating the first protective system.
Figure 2F:
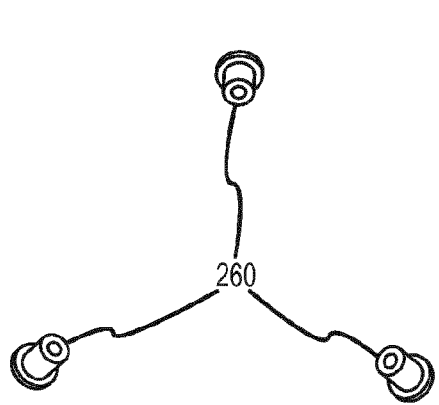
FIG. 2F shows a perspective view of connection structures.
Figure 2G:
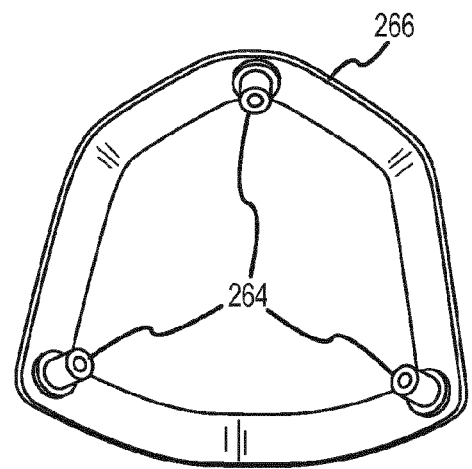
FIG. 2G shows a perspective view of another connection structure.

Described herein are protective systems for use with a suitcase or other types of luggage. The protective systems may be formed using one or more corner elements. In some implementations, one of the corner elements may take the form of a deformable body or deformable member with shock absorbing properties, force-dampening properties, sound dampening properties, vibration absorptive properties, or some combination thereof. The deformable body may be configured with an exterior surface or shape similar to the exterior corner of a typical luggage piece. The interior surface or shape of the deformable body may have a complementary shape to the shape of the exterior corner of the luggage piece. The deformable body may be joined to external corner areas of a luggage piece by fastening structures such as a rigid boss and fastener connection or a threaded screw and nut connection. The deformable body may be formed using a foam, a gel, a visco-elastic material or any other elastic or deformable material, or any combination thereof. In some implementations, the corner system may include a corner element that takes the form of a cover. The cover may provide shock absorption, vibration absorption, force dampening, sound dampening or some combination thereof.

The protective systems may be sized and shaped for many sizes or shapes of luggage, but generally, luggage pieces having a generally three-dimensional rectangular or cube-shape may receive one or more protective systems on the corners of suitcase. The protective systems described herein may also be located along the generally linear edges defined between faces of the luggage piece. The luggage pieces may have hard or soft sides and may be formed from many types of material or construction used to form luggage pieces, including, but not limited to, fabrics (e.g., nylon), plastics (e.g., acrylonitrile butadiene styrene ("ABS"), polycarbonate, polypropylene, polyethylene, etc.), natural materials (e.g., plywood), metals, or some hybrid combination thereof. The luggage pieces may include at least a substantially rigid outer structure to which the protective systems may be joined. The luggage pieces may further include structures, such as lining or internal panels, positioned within the main enclosed space that divide it into two or more compartments. The luggage pieces may also include any of the following: two or more wheels for moving the suitcase along a support surface, one or more carry handles to lift or otherwise move the suitcase, a telescoping handle to facilitate moving the suitcase along the support surface via the wheels, edge piping to help protect the outer surface and edges of the suitcase from scuffs and abrasions, and at least one perimeter opening mechanism, such as a zipper or latch, to access the main enclosed space and any pockets or secondary or supplemental enclosed spaces.

Referring generally to FIGS. 1A-1E a luggage piece or case 100 including a exterior structure 101 defining an interior compartment 102 (FIG. 2E), corner regions 104, and defining a front side or face (FIG. 1A), a right side or face (FIG. 1B), a back side or face (FIG. 1C), a left side or face (FIG. 1D) and a top side or face (FIG. 1E), and a bottom side or face 113. Top and bottom peripheral edges 105 are defined by the respective intersection of the top side and the left, right, front and back sides. Side peripheral edges 106 are defined by the intersection of the front, back, left and right sides. The luggage case 100 may also include wheels 107, and retractable and carry handles 108, Referring still to FIGS. 1A-1E, the corner regions 104 may include a protective system 200. The protective system 200 may include a deformable body 202 and a cover 204. However, as provided in the implementations below, the protective system 200 may include one or the other of the deformable body or cover. The protective systems of the second through seventh implementations may also be provided on the luggage piece 100 shown in FIGS. 1A-1E. Further, each protective system on the luggage piece 100 may be configured as any of the implementations provided herein, or variations thereof, and thus the luggage piece 100 is not limited to receiving one type of protective system.

The corners 104 located at the bottom of the luggage case 100, also referred to as the bottom corners 112, may include wheel structures 107. The wheel structures 107 incorporate the protective systems 200. For example, FIGS. 1A-1E depict spinner wheels 107 joined to the bottom corners 112 of the luggage piece 100 by forming a connection with the cover 204 of the protective system 200. In some implementations, the wheels 107 may be offset from the protective system 200 and may be joined directly to the shell exterior 101. The protective system 200 including wheels 107 may serve to reduce sounds generated by the wheels 107 rolling or moving due to the protective systems 200 absorbing and transmitting impact forces. For example, as the wheels 107 roll on rough surfaces, the protective system 200 may absorb impacts that may otherwise be transmitted from the wheels 107 to the luggage piece 100, which may reduce the amount of sound generated by the wheel 107. The protective system 200 including wheels 107 may also serve to reduce vibration of the luggage case 100 during transportation, which may be caused by vibration of the wheel 107. For example, as the wheels 107 roll on rough or uneven surfaces, the rough or uneven surfaces may cause the wheels 107 to vibrate, which in turn may cause the luggage case 100 to vibrate. Since the protective system 200 may absorb the forces caused by the vibration of the wheels 107, the impact of the vibration of the wheels 107 on the luggage piece 100 may be reduced. The luggage piece 100 may travel in a stable manner even on uneven surfaces.

The elements of the protective systems may be joined, and the protective systems may be joined to the luggage piece, by any suitable connection structure. For example, the protective system may be joined to the luggage piece using mechanical fasteners (e.g., threaded screws, stitches, rivets, snaps and so on), adhesives, welds or any other known connection mechanism.

Referring now to FIGS. 2A-2G, recesses 103 (also referred to as indentations or indented contours) are formed at corner regions 104 for receiving the deformable body as well as fastening structures such as rigid or deformable bosses and fasteners for joining the protective systems to the shell. Each recess 103 may be formed when the luggage case is molded or constructed, or may be formed afterward. The recess 103 may include a base wall 115 defining the bottom of the recess, and a peripheral wall 117 defining the size of the base wall 115. The luggage piece 100 may include a protective system (e.g., protective system 200) joined to each of its eight corners as depicted in FIGS. 1A-E. However, the luggage piece 100 may include more or less than eight protective systems joined thereto depending on the size and shape of the suitcase. For example, in addition or as an alternative to the eight protective systems, the luggage piece 100 may additionally include protective systems along the top edges 105, side edges 106 and/or along the retractable handle 108 of the luggage piece 100. It should be noted that the recess for receiving each of the other implementations described herein of the protective system may include a base wall and a peripheral wall similar to those described with respect to this implementation.

FIGS. 2A-2C show a front perspective view, a rear perspective view and a cross-section view, respectively, of the protective system 200 separated from the luggage piece 100 according to a first implementation. The protective system 200 of the first implementation may include an exterior surface or shape similar to the shape of a rounded corner of a typical luggage piece, and an interior surface or shape that may be complementary to the indented corner region 103 of the exterior 101 of the luggage piece 100 configured to receive the protective system 200 (see FIG. 2E).

The cover 204 may be a generally rigid structure formed with a rounded triangular shape having a protruding central region 216. The cover 204 joins to the deformable body 202 at a recessed area 218 (FIGS. 2C and 2D) of the deformable body exterior surface 220. The cover interior surface 222 of the cover 204 and the external surface 220 of the deformable body 202 may have a complementary shape so that all or a portion of the cover interior 222 contacts the underlying deformable body exterior 220. The cover interior 222 may also form cover bosses 224 that protrude generally at a right angle from an interior surface of the cover 204.

The deformable body 202 may also be formed with a rounded triangular shape with a protruding central region 226. An outer region 228 of the deformable body 202 may extend beyond a periphery 230 of the cover as shown in FIG. 2A. The recessed area 218 of the deformable body exterior 220 may be formed with a surface that is complementary to an internal surface the cover interior 222. A depth of the recessed area 218 may substantially correspond to the thickness of the cover 204, or the cover 204 may have a thickness that is relatively thicker or thinner than the recessed area 218. In some implementations, the thickness of the cover 204 may match a dimension of the surface of the shell exterior 101 so that the shell exterior 101 and the cover exterior 232 extend along the same plane (see, e.g., FIG. 2D). The deformable body outer region 228 may be slightly stepped or recessed from a cover exterior 232 and the shell exterior 101 (see, e.g., FIG. 2D).

The deformable body 202 may include an enlarged central region 240 and enlarged corner regions 242 of the relatively thicker deformable body 202 compared to inner regions 244 proximate the corners 245 as shown in FIGS. 2B and 2D. The enlarged central region 240 may correspond to or underlie the rounded corner or apex 246 of the protective system 200. The enlarged corner regions 242 may correspond to portions of the deformable body 202 underlying the outer region 228 of the deformable body exterior 220 that is free from the cover 204 or areas proximate the periphery and/or the corners 248 of the cover 204. The enlarged central and corner regions 240, 242 may be formed in the protective system 200 in the areas that most commonly receive impact forces and/or in areas where the impact forces are to be transmitted and absorbed by the deformable body 202.

With reference to FIG. 2B, three bores 250 may be formed in the deformable body 202. Each deformable body bore 250 may extend through the enlarged corner regions 242 of the deformable body 202 proximate the area where a rounded corner 248 of the triangular shaped cover 204 overlays the recessed area 218 of the deformable body 202. Each deformable body bore 250 may receive a cover boss 224 extending from the cover interior 222. Each deformable body bore 250 may include a smaller diameter proximate the deformable body exterior 220 compared to the diameter of the deformable body bore 250 proximate the deformable body interior 252. The cover 204 and the deformable body 202 join to each other by way of the cover boss 224 and deformable body fastener 254 assemblies. A deformable body fastener 254 inserted through a bore 250 from the deformable body interior 252 may establish a secure connection with the deformable body 202 and the cover boss 224 due to the portion of the deformable body bore 250 surrounding the smaller diameter of the bore 250 being sandwiched between the flange 256 of the deformable body fastener 254 and a terminal end of the cover boss 224. FIG. 2C shows a cross-sectional view of the cover 204 and the deformable body 202 joined by way of the cover boss 224 and deformable body fastener 254. In alternative implementations, the cover 204 and the deformable body 202 may be connected by an adhesive or through a lamination process.

FIGS. 2D and 2E show the first protective system 200 for joining to the shell of a luggage piece. The deformable body 202 may include deformable body bosses 260 (FIG. 2F) over-molded or inserted into a boss recess 261 formed in the deformable body 202 that extends from the deformable body interior 252 towards the deformable body exterior 220 along a length of the deformable body boss 260, but the boss recess 261 generally does not extend through to the exterior of the deformable body 202. The deformable body boss 260, inserted or over-molded in the deformable body 202, is a generally rigid structure that may include a flange portion 262 nested within the boss recess 261 to establish a secure connection between the deformable body boss 260 and the deformable body 202. The receiving-end of the deformable body boss 260 may be exposed at the deformable body interior 252 (see FIG. 2B). To join the protective system 200 to the shell exterior 101 of the luggage piece 100, the protective system 200 may be positioned proximate the indented corner region 103 of the luggage piece 100 and a protective system fastener 110 (FIG. 2E) may be inserted through the shell interior 102 via a shell bore 109 that extends from the shell interior to the shell exterior 101 and into the deformable body boss 260. In some implementations, a deformable boss 111 may be provided between the protective system fastener 110 and the shell bore 109, described below. The protective system fastener 110 and the deformable body boss 260 may be configured so that the protective system fastener 110 remains secured to the deformable body boss 260 when received within the deformable body boss 260. For example, the deformable body boss 260 and the protective system fastener 110 may be sized so that the fastener 110 is joined by a press or interference fit. As another example, the deformable body boss 260 and the protective system fastener 110 may each include threads so that these members are joined via a threaded connection. In other examples, the boss 260 and fastener 110 may be secured by adhesion, welds or other suitable connection means.

In some implementations, deformable bosses 111 may be provided for insertion through the shell interior 102 via a shell bore 109 for absorbing and dampening impacts between the luggage piece 100 and the fasteners 110 or between the luggage piece and other boss and fastener systems and methods. The deformable bosses 111 may define openings for receiving fasteners 110, which may enable the fasteners 110 to join to the deformable body boss 260. The deformable bosses 111 may include an enlarged portion with an outer diameter that is larger than the diameter of the enlarged head of the fasteners 110 and an inner diameter that is similar to the outer diameter of the elongated body of the fasteners 110. A narrower portion of the deformable bosses 111 may include an outer diameter that is similar to the inner diameter of the shell bore 109, which may enable the deformable bosses 111 to be inserted through the shell interior 102 via the shell bore 109 to the shell exterior 101. As impact forces are exerted from the protective system 200 or the shell interior 102 to the fastener 110, or as impact forces are exerted from the fastener 110 to the protective system 200 or the shell interior 102, the deformable bosses 111 may absorb and dampen the impact forces. In some implementations, the deformable bosses 111 may absorb and dampen impact forces in the manner the deformable bodies absorb and dampen impacts as discussed above. For example, in implementations in which impact forces may be transmitted directly from the protective systems to the fasteners 110, such as protective system 300, the deformable bosses 111 may absorb and distribute impact forces such as shear, torque and rotational forces transmitted by the protective systems to the fasteners 110, and thus forces transmitted from the fasteners 110 to the luggage piece 100 may be reduced. The deformable bosses may be formed of one or more layers of the materials forming the deformable bodies discussed above. Deformable bosses 111 may alternatively be replaced with bosses made of non-deformable material.

Some or all of the deformable body bosses 260 positioned within the deformable body 202 may be joined with fasteners 110. In addition, more than one deformable body boss 260 may be provided by the protective system 200, such as three as shown in FIG. 2B. Although FIGS. 2A-2D depict the individual bosses 260 of FIG. 2F arranged or overmolded in the deformable body 202, bosses 264 may also be formed by a boss plate 266 shown in FIG. 2G. The boss plate 266 may be inserted or over-molded in the deformable body 202 so that the receiving-end of the bosses 264 are exposed at the deformable body interior 252 in a manner similar to the bosses 260 shown in FIG. 2B for receiving the protective system fasteners 110.

The cover 204 and the deformable body 202 underlying the cover 204 in the first implementation enables impacts received at the cover exterior 232 to be dampened and/or absorbed by the cover 204 and the deformable body 202. For example, as a localized impact (e.g., normal, perpendicular forces and/or shear, parallel or tangential forces) is exerted at the cover exterior 232, the localized impact is dampened by distributing the force across the cover 204 to a larger surface area at the cover interior 222 and then to the deformable body exterior 220 coupled to the cover 204. The dampened impact transmitted through the cover 204 to the deformable body 202 may be received by the enlarged central region 240 of the deformable body 202 so that the deformable body 202 absorbs the distributed impact, for example by deforming inwardly. The deformable body 202 also serves to dampen the impact by distributing the impact force throughout the deformable body 202, e.g., to the enlarged corner regions 242, so that any force reaching the deformable body interior 252, and thus the exterior surface of the indented corner region 103 of the luggage piece 100, is spread out over a larger surface area. The interface between the deformable body interior 252 and the exterior shell 101 may also allow the luggage piece 100 to deflect inwardly to absorb the impact force at the indented corner region 103, proximate the indented corner region 103 or at the luggage piece 100 generally. When localized forces are applied to the deformable body exterior 220 at the outer region 228, e.g., not via the cover, the force is absorbed by the deformable body 202 and any remaining force is transmitted through the deformable body 202 including the enlarged corner region 240, thereby spreading the force over a larger surface area of the deformable body 202 as well as to the underlying luggage piece 100. Thus, in addition to the deformable body 202 absorbing impacts before reaching the luggage piece, the cover 204 and the deformable body 202 receive forces over a given surface area and dampen the forces over a relatively larger surface area, thereby lessening the chances of damage to the luggage piece 100 and its contents.

FIGS. 3A-3C show a front perspective view, a rear perspective view and a cross-section view, respectively, of the protective system 300 according to the second implementation. The protective system 300 of the second implementation may provide an exterior shape similar to the shape of a rounded corner of a luggage piece and an interior shape that is complementary to the indented corner region 103 of the shell of the luggage piece 100 configured to receive the protective system 300 (see FIG. 3E). This protective system 300 may include a deformable body 302 and a frame 304 with an open region 306 that surrounds a deformable body periphery 308 and enables the deformable body to be exposed through the open region 306. In this second implementation, the deformable body 302 exposed in the central portion of the protective system 300 may directly receive impact forces. However, a cover may be joined to the deformable body or the frame to cover the deformable body 302.

The frame 304 may include a triangular shaped periphery and a triangular shaped open region 306. At the frame interior 310, three frame bosses 312 may protrude from the corners 314 of the frame 304, and the frame bosses 312 may be sized and shaped to be received by a shell bore 109 or by a deformable boss 111 extending through the shell bore 109. The frame 304 may use more or less frame bosses 312 than the three bosses 312 depicted in FIG. 3B. When assembled with the luggage piece 100, the exterior 316 of the frame 304 may be arranged slightly recessed from the deformable body 302 and the shell exterior 101 as shown in FIG. 3D, or the frame exterior 316 may be arranged parallel or slightly elevated with respect to one or both of the deformable body exterior 318 and the shell exterior 101. The frame 304 may be a generally rigid structure formed of polycarbonate ("PC"); polyamide or polyacetate ("PA"); polycarbonate/ acrylonitrile butadiene styrene ("PC/ABS"); polyurethane ("PU"); thermoplastic polyurethane ("TPU") and the like.

The deformable body 302 may include an enlarged central region 320, a top region 322 and a bottom region 324 as shown in FIG. 3C. The enlarged central region 320 may form the rounded corner or apex 326 of the deformable body exterior 318, which may correspond to an area of the deformable body 302 that most commonly receives impact forces. The top region 322 of the deformable body 302 may be relatively smaller compared to the enlarged central region 320, but larger than the bottom region 324 of the deformable body 302. The thickness of the top and bottom regions 322, 324 of the deformable body 302 may correspond to the likelihood that the regions receive impact forces and/or areas where it is desirable for the impact forces to be absorbed and transmitted through the deformable body 302.

The portion of the frame 304 overlaying the deformable body 302 and the deformable body periphery 308 together forms a lap joint 330. The frame bosses 312 protruding from each of the three corners 314 of the frame 304 are received by the shell bores 109 (see FIG. 3E) and may protrude into the shell interior 102. A fastener 110 may be inserted from the shell interior 102 through the shell bore 109 or through the frame bosses 312 extending through the shell bore 109 to join the frame 304 to the indented corner region 103 of the luggage piece 100. In some implementations, a deformable boss 111 may be provided between the frame bosses 312 and the shell bore 109 and/or between the protective system fastener 110 and the shell bore 109. For example, the portion of the deformable boss 111 extending through the shell bore 109 may provide for absorbing and dampening impact forces between the frame bosses 312 and the shell bore 109 and the portion of the deformable boss 111 arranged at the shell interior 102 may provide for absorbing and dampening impact forces between the fastener 110 and the shell bore 109. As described in more detail above, each frame boss 312 and respective fastener 110 may be secured to each other by any suitable connection method or system. Due to the lap joint 330 formed between the frame 304 and the deformable body periphery 308 and the deformable body interior 310 having a shape complementary to the indented corner region 103, the deformable body 302 is securely fitted between the frame 304 and the shell exterior 101 (see FIG. 3D). However, the deformable body 302 and the frame 304 may be joined using mechanical fastening systems or adhesive bonding. Generally, the deformable body may be shaped so that the frame bosses 312 and the deformable body 302 do not contact each other upon securely fitting the protective system 300 to the luggage piece 100.

As provided above, the deformable body 302 exposed from the frame 304 in the second implementation may include an enlarged central region 320 that enables impacts received at the deformable body exterior 318 and/or the frame 304 to be absorbed by the deformable body 302 and to be transmitted throughout the deformable body 302. For example, as a localized impact (e.g., normal, perpendicular forces and/or shear, parallel or tangential forces) is exerted at the deformable body exterior 318 proximate the enlarged central region 320, the deformable body 302 absorbs the localized impact. The deformable body 302 also transmits any non-absorbed impact force throughout the deformable body 302 so that the force reaching the deformable body interior 310, and thus the exterior surface of the indented corner region 103 of the luggage piece 100, is spread out over a larger surface area. The frame 304 may also be configured to receive impacts and to transmit the force to the deformable body 302 so that the deformable body 302 transmits the impact over a relatively larger surface area than the surface area of the frame 304 receiving the impact. Thus, in addition to the deformable body 302 absorbing impact forces before reaching the luggage piece 100, the deformable body 302, and in some instances the frame 304, receives forces over a given surface area and transmits the forces to the deformable body 302 or the luggage piece 100 over a relatively larger surface area for impact dampening.

Figures 4C, 4D:
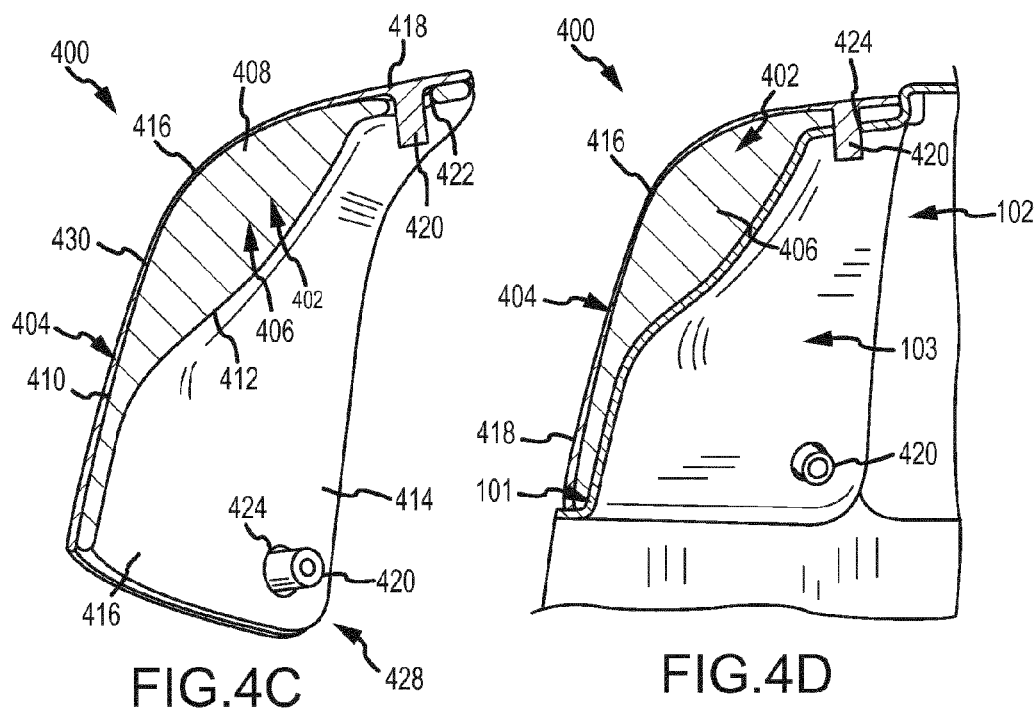
FIG. 4C shows a cross-sectional view of the third protective system of FIGS. 4A-4B, viewed along line 4C-4C in FIG. 4B.
FIG. 4D shows a partial cross-sectional view of the luggage piece of FIGS. 1A-1E, viewed along line A-A in FIG. 1 and incorporating the third protective system of FIGS. 4A-4C.

FIGS. 4A-4C show a front perspective view, a rear perspective view and a cross-sectional view, respectively, of the protective system 400 according to the third implementation. The protective system 400 of the third implementation may provide an exterior shape similar to the shape of a rounded corner of a luggage piece and an interior shape that is complementary to the indented corner region of the shell of the luggage piece configured to receive the protective system (see FIG. 4E). This protective system may include a deformable body 402 and a cover 404 that substantially covers the exterior surface of the deformable body 402 as shown in FIG. 4A. The deformable body 402 may include an enlarged central region 406 forming a rounded corner or apex 408 at a deformable body exterior 410 and a bulbous portion 412 at the deformable body interior 414. The cover 404 may include a thin portion 416 at the apex 408 of the deformable body 402 surrounded by a relatively thicker rigid periphery 418 proximate an area where the cover bosses 420 are formed. The cover interior 422 and the deformable body exterior 410 may have a complementary shape so that all, or a substantial portion, of the cover interior 422 contacts the underlying deformable body exterior 410.

Figure 4E:
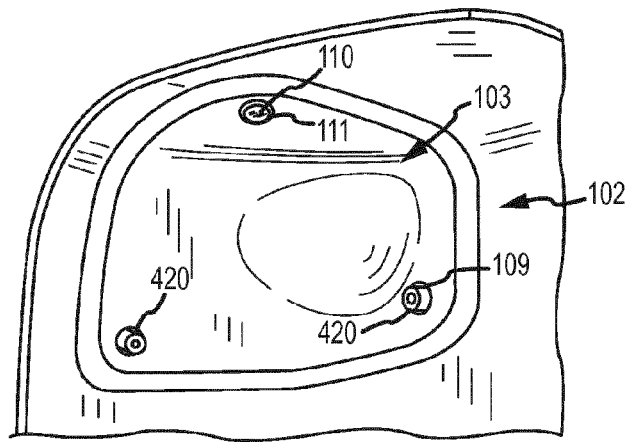
FIG. 4E shows a partial perspective view of the luggage piece incorporating the third protective system.

The cover bosses 420 protruding from each of the three corners of the cover interior 422 may be received by the shell bores 109 (see FIG. 4E). A fastener 110 may be inserted through the shell bore 109 from the shell interior 102 to the shell exterior 101 and into the cover bosses 420 to secure the cover 404 to the luggage piece 100. In some implementations, a deformable boss 111 may be provided between the cover bosses 420 and the shell bores 109, between the protective system fastener 110 and the shell bore 109 or both. For example, a portion of the deformable boss 111 may extend through the shell bore 109 to the bores 424 of the deformable body 402 and may provide for absorbing and dampening impact forces between the cover bosses 420 and the shell bore 109, and a portion of the deformable boss 111 may be arranged at the shell interior 102 and may provide for absorbing and dampening impact forces between the fastener 110 and the shell bore 109. As described in more detail above, each cover boss 420 and respective protective system fastener 110 may be secured to each other by any suitable connection method or system. In addition, the cover 404 may use more or less cover bosses 420 than the three cover bosses 420 depicted in FIG. 4B. The deformable body 402 may be shaped so that bores 424 extend through the deformable body 402 at the deformable body periphery 426 in the corner regions 428 proximate the cover bosses 420, which may enable the cover bosses 420 to extend through the deformable body bores 424. Due to the arrangement of the cover bosses 420 extending through the deformable body bores 424 and the deformable body interior 414 (e.g., bulbous portion) having a shape complementary to the indented corner region 103, the deformable body 402 may be securely fitted between the cover 402 and the luggage piece 100 (see FIG. 4D).

As provided above, the deformable body 402 of the third implementation may include an enlarged central region 406, and the cover 404 may include a thin portion 416 overlying the enlarged central region 406. The thin portion 416 of the cover 404 enables impacts received at the thin portion 416 of the cover exterior 430 to be transmitted to the deformable body 402 at the enlarged central region 406 so that the impact force is absorbed by the deformable body 402 may be transmitted throughout the deformable body 402. For example, a localized force applied to the cover exterior 430 at the thin portion 416 may cause the thin portion 416 to deflect or deform inwardly into the deformable body 402. The deformable body exterior 410 at the enlarged central region 406 may receive the localized impact and may deform to absorb the force. Any remaining force may be transmitted throughout the deformable body 402, e.g., to the deformable body periphery 426 and the bulbous portion 412, so that the force reaching the deformable body interior 414 and the exterior surface the indented corner region 103 of the luggage piece 100 may be spread out over a larger surface area. For localized forces applied to the cover exterior 430 at relatively thicker portions, e.g., at the rigid periphery 418 proximate the cover bosses 240, rather that deflecting inwardly, the cover exterior 430 may receive the localized impact and distributes forces across the cover 404 to a larger surface area of the cover interior 422 and then to the deformable body exterior 410 joined to the cover interior 422. In addition to the deformable body 402 absorbing the impact forces, the deformable body 402, and in some instances the cover 404, may receive forces over a given surface area and may transmit the forces to the deformable body 402 or the shell 404 over a relatively larger surface area, which may lessen the chances of damage to the luggage piece 100 or its contents.

FIG. 5 shows a front perspective view of the protective system 500 according to the fourth implementation. The protective system 500 of the fourth implementation may provide an exterior shape similar to the shape of a rounded corner of a luggage piece and an interior shape that is complementary to the indented corner region of the shell of the luggage piece (see e.g., FIGS. 2E, 3E and 4E). The protective system 500 may include a deformable body 502 and a cover 504 that may be generally pliable and flexible. For example, the cover 504 may be formed a thermoset plastic such as Elastoskin®, an aromatic-isocyanate-based plastic that is a thermoset plastic providing an outer layer having a soft cover or leather-like feel, which may resist cracking over a wide temperature range, or an aliphatic-isocyanate-based spray polyurethane cover. The pliable cover 504 may be tear, abrasion and/or scuff-resistant. Compared to the underlying deformable body 502, the pliable cover 504 may be more resistant to wear but may have less impact absorption properties.

The deformable body 502 of the fourth implementation may be sized and shaped in the manner provided in connection with FIGS. 2A-2D, 3A-3D, 4A-4D or any combination thereof. For example, although not shown, the deformable body 502 may include an enlarged central region with a bulbous internal surface as well as enlarged corner regions. Alternatively, the deformable body 502 may be provided with a substantially constant thickness throughout.

Generally, the cover 504 and the deformable body 502 may have a complementary shape so that all or a substantial portion of the cover interior contacts the underlying deformable body exterior. For example, the pliable cover 504 may be applied to the deformable body 502 by spray coating or by reaction injection molding processes. In addition, the pliable cover 504 may be applied in a layer of relatively uniform thickness or may include surface textures, e.g., leather-like, or features, e.g. bumps or ridges. In certain implementations, the cover 504 of the protective system 500 may include regions of a pliable cover and regions of a rigid cover.

The cover 504 may include bores 506 or bosses at the corner regions 508 for joining the protective system to the shell of the luggage piece. For example, the cover 504 and the deformable body 502 may be formed such that bores 506 align with deformable body bores (not shown), and screw fixations extending from an exterior 510 of the cover 504 through shell bores 109 to the shell interior 102 of the luggage piece 100 may secure the protective system 500 to the luggage piece 100. In some implementations, a deformable boss 111 may be provided between the screw fixations and the shell bore 109.

Instead of or in addition to bores 506 formed through the cover 504, cover bosses (not shown) may be provided for securing fasteners thereto (e.g., fasteners 110). Fasteners may extend from the interior of the shell of the luggage piece through shell bores 109 into the hole defined by the bore of the cover boss. In addition, a deformable boss 111 may be provided between the shell bore 109 and the fasteners. The cover bosses may be formed of a rigid material such as the materials for forming the rigid cover provided in the implementations above. The deformable body may or may not be formed around the cover bosses. For example, the deformable body and the bosses may be configured in the manner described above in connection with FIGS. 2A-2D, 3A-3D, 4A-4D.

As provided above, the cover 504 of the fourth implementation may be a pliable cover overlying the deformable body. The pliable cover 504 may enable forces received at the cover exterior 510 to be transmitted to the deformable body 502 so that some or all of the force may be absorbed by the deformable body 502 and any remaining force may be transmitted throughout the deformable body 502. For example, a localized force applied to the exterior 510 of the pliable cover 504 may cause the pliable cover 504 to deflect or deform inwardly into the deformable body 502. The deformable body 502 exterior may receive the localized impact force and deform to absorb the impact force. The deformable body 502 may transmit the remaining, non-absorbed force of the localized impact throughout the deformable body 502, which may dampen the impact force so that any force reaching the deformable body interior and the exterior surface of the indented corner region 103 of the shell (see e.g., FIGS. 2E, 3E and 4E) may be spread out over a larger surface area. Thus, the pliable cover 504 may provide durability to the protective system 500 but may receive forces over a given surface area and may transmit substantially the same force in the given surface area to the deformable body 502, while the deformable body 502 may absorb some of the force and may transmit the remaining force throughout the deformable body 502 and to the luggage piece 100 over a relatively larger surface area than the area receiving the initial impact force, which may lessen the chances of damage to the luggage piece or its contents.

According to certain implementations, the cover 504 of FIG. 5 may be formed of another deformable layer that overlays a deformable body. The cover may be formed of one or more layers of ethylene-vinyl acetate ("EVA"); expanded polypropylene ("EPP"); foamed thermoplastic elastomer ("TPE"); and/or foamed polyurethane provided as a durable foamed cover. The deformable cover may be selected for certain properties, such as durability, while the underlying deformable body layer may be selected for another property, such as shock absorption and dampening.

The cover 504 may be spray coated or over-molded with the deformable body. The cover and the deformable body may also be coupled through mechanical or adhesive fastening. The cover 504 may enable impacts received at the cover exterior to be transmitted to the underlying deformable body so that the impact force is absorbed by the deformable body and is transmitted throughout the deformable body layer in the manner described above.

Figure 6C:
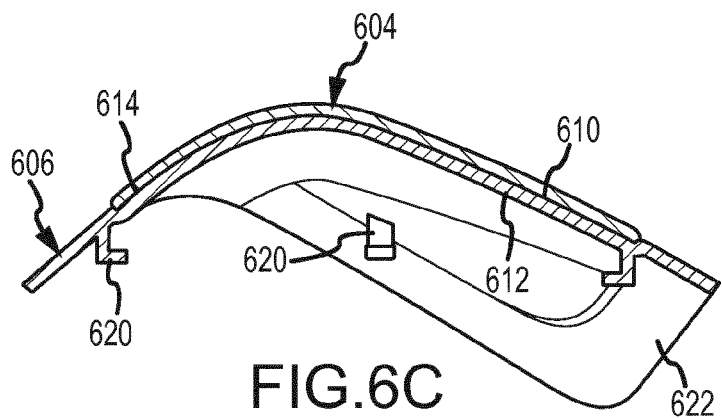
FIG. 6C shows a cross-section view of the protective system without a deformable body according to the fifth implementation, viewed along line 6C-6C in FIG. 6A.
Figure 6D:
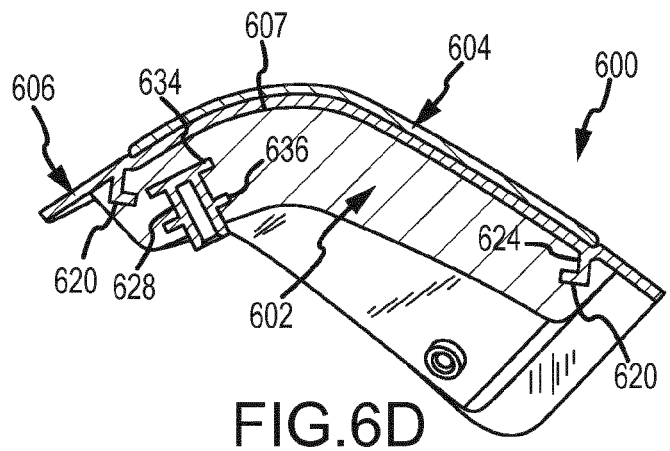
FIG. 6D shows a cross-section view of the protective system with a deformable body according to the fifth implementation, viewed along line 6D-6D in FIG. 6B.

FIGS. 6A-6B and 6D show a front perspective view, a rear perspective view and a cross-sectional view, respectively, of the protective system 600 according to the fifth implementation. The protective system 600 of the fifth implementation may provide an exterior shape similar to the shape of a rounded corner of a luggage piece and an interior shape that is complementary to the indented corner region of the shell of the luggage piece (see e.g., FIGS. 2E, 3E and 4E). This protective system 600 may include a deformable body 602, a first cover layer 604 and a second cover layer 606. The first cover layer 604 may cover a portion of the second cover layer 606, and the second cover layer may substantially cover the exterior surface 607 of the deformable body.

The first cover layer 604 may overlay the second cover layer 606 in a central region 608 of the second cover layer 606. The first cover layer 604 may be formed with an internal surface 610 that is complementary to the recessed area 612 of the external surface 614 of the second cover layer 606.

The exterior of the second cover layer 606 may include surface structures such as the recessed area 612 and an outer region 616. The recessed area 612 may receive the first cover layer 604, while the outer region 616 of the second cover layer 606 may extend beyond a periphery 618 of the underlying deformable body 602, as also provided below. The second cover layer 606 may include anchors 620 (FIGS.

6C and 6D) for coupling with the deformable body 602 at the interior surface 622 of the second cover layer 606. The anchors 606 may be formed of L-shaped structures that include a leg depending downwardly from the cover interior of the second cover layer and then inwardly at a right angle towards a center of the protective system. However, the anchors 620 may be formed with any shape suitable for securely fitting with the deformable body. The deformable body 602 may be configured to receive the anchors 620, for example, within a groove 624 formed in a recess of the deformable body 620 having a complementary shape to the anchors 620 for a secure fit.

The first cover layer 604 may be joined to the second cover layer through 606 mechanical or adhesive fastening, or the first and the second cover layer 604, 606 may be formed together through an injection molding or over-molding process. The surfaces, e.g., exposed or exterior surfaces, of the first and/or the second cover layer may be smooth or may be textured, e.g., with a cloth or leather-like feel, or may include surface features, e.g. bumps or ridges. In some implementations, the first or the second cover layer 604, 606 may be pliable, while the other cover layer 604, 606 may be rigid.

The deformable body 602 may be formed with a thickness that is at least the depth of the anchors 620 to enable the anchors 620 and thus the first and second cover layers 604, 606 to be securely joined to the deformable body 602. The deformable body 602 may have a substantially constant thickness or may include enlarged regions such as an enlarged central region and/or enlarged corner regions described above in connection with the first through fourth implementations. The deformable body 602 may be sized with a periphery 618 that is smaller than a periphery 626 of the second cover layer 606 so that second cover layer 606 extends beyond the deformable body 602.

The deformable body 602 may securely receive deformable body bosses 628 within a recess of the deformable body 602. The deformable body bosses 628 may be formed individually or by a boss plate shown in FIG. 2G. The deformable body bosses 628 may be over-molded by the deformable body 602 or may be or inserted into a boss recess formed in the deformable body 602 that extends from the deformable body interior 630 towards the deformable body exterior 607 along a length of the deformable body boss 628. In the example of a boss recess, the boss recess generally does not extend through to the exterior of the deformable body 602. The deformable body boss 628, inserted into or over-molded in the deformable body, may include two flange portions 634, 636 nested within the deformable body 602 to establish a secure fit between the deformable body boss 628 and the deformable body 602. The receiving-end of the deformable body boss 628 may be exposed at the deformable body interior 630 (see FIG. 6B). To join the protective system 600 to the luggage piece 100, the protective system 600 may be inserted into an indented corner region 103 of the luggage piece 100 having a shape that is complementary to an internal surface of the deformable body interior 630 and the second cover layer interior 622, and a protective system fastener 110 may be inserted through the shell interior 102 to the shell exterior 101 (see also, e.g., FIGS. 2E, 3E and 4E) via a shell bore 109 and connect to the deformable body boss 628. The protective system fastener 110 secures to the boss 628 within the deformable body 602 and thus the protective system 600 to the indented corner region 103 of the luggage piece 100. In some implementations, a deformable boss 111 may be provided between the protective system fastener 110 and the shell bore 109.

The first and second cover layers 604, 606 and the deformable body 602 underlying the cover in the fifth implementation may absorb impacts received at the exterior of the first cover layer 604 and/or the second cover layer 606 and at the deformable body 602. For example, a localized impact (e.g., normal, perpendicular forces and/or shear, parallel or tangential forces) may be exerted at an exterior surface 638 of the first cover layer 604 and the first cover layer 604 may distribute this force across the first cover layer 604 over a larger surface area and to the first cover layer internal surface 610. This force may then be transmitted to the external side 614 of the rigid second cover layer 606. The distributed force exerted on the exterior surface 614 of the second cover layer 606 may be distributed across an exterior surface 607 of the deformable body 602 by yet a larger interior surface area of the interior 622 of the second cover layer 606. Thus, the impact transmitted through the cover layers 604, 606 may be absorbed by the deformable body 602 over a larger surface area, e.g., by deflecting inwardly over a larger surface area, than the surface area of the first cover layer 604 and/or second cover layer 606 receiving the localized impact. As a result, the deformable body 602 may absorb the distributed impact and transmits any remaining impact force throughout the deformable body 602. The force reaching the deformable body interior 630 and then the exterior surface of the indented corner region 103 of the luggage piece 100 may be spread out over a relatively larger surface area. Thus, the first and second cover layers 604, 606 and the deformable body 602 may each receive forces over a given surface area and may transmit the forces to the deformable body 602 or the luggage piece 100 over a relatively larger surface area, for force absorption and dampening by the deformable body 602, which may lessen the chances of damage to the luggage piece 100 or the contents contained therein.

Figure 7:
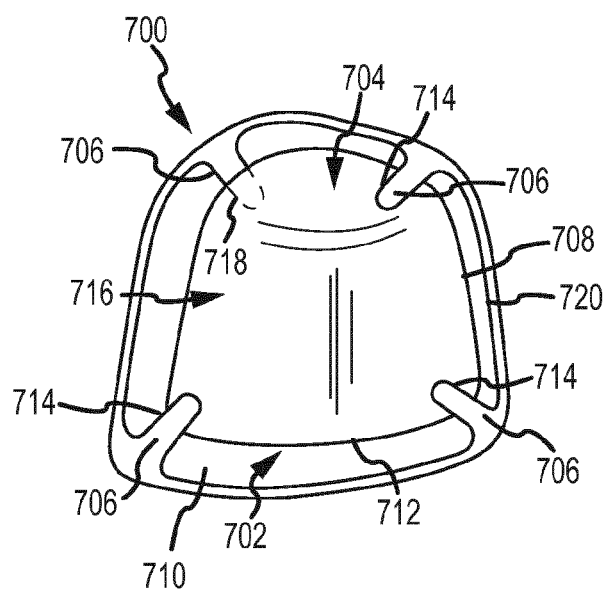
FIG. 7 shows a front perspective view of a protective system according to a sixth implementation.

FIG. 7 shows a front perspective view of the protective system 700 according to the sixth implementation. The protective system 700 of the sixth implementation may provide an exterior shape similar to the shape of a rounded corner of a luggage piece and an interior shape that is complementary to the indented corner region of the shell of the luggage piece (see e.g., FIGS. 2E, 3E and 4E). Elements of the protective system 700 may include a deformable body 702 and a cover 704 that may be generally rigid. The cover 704 may be movably joined to the protective system 700 by way of attachment legs 706 formed of a deformable elastic material. The deformable body 702 underlying the cover 704 may be similar to the deformable body 202 of the first implementation, for example, and may include a recessed area 708 for receiving the cover 704. The exterior surface 710 of the deformable body 702 in the sixth implementation may also serve as a bearing surface 712 for the movable cover 704. As the cover 704 receives an impact, such as a shear force, the cover 704 may move along the bearing surface 712 of the deformable body 702 against an elastic force of the attachment legs 706.

The attachment legs 706 may be attached to the cover 704 at a number of attachment regions 714 along the cover exterior 716. The attachment legs 706 may be received on the cover 704 by way of an external attachment or along the cover interior surface by way of an internal attachment 718. In locations where the cover 704 attaches to the attachment legs 706, the cover 704 may include recesses shaped similar to the attachment legs. The attachment legs may extend from an attachment structure 720 surrounding the deformable body. Alternatively, the attachment legs 706 may extend from an interior of the deformable body 702 through deformable body bores and attach to the cover. Generally, the attachment legs 706 are free of attachments to the bearing surface 712 of the deformable body 702 in areas proximate the cover 704 to enable the cover 704 to move along and over the bearing surface 712 without the structure of the legs 706 interfering with the movement of the cover 704 over the bearing surface 712.

The protective system 700 of the sixth implementation may join to the indented corner region 103 of the luggage piece 100 in the various ways described above in connection with the first through fifth implementations, such as through securement devices including a deformable body boss and protective system fastener attachment with or without a deformable boss or through a threaded screw fixation attachment.

As described above, the cover 704 of the sixth implementation may be movably attached to the deformable body 702 by way of the elastic attachment legs 706. This may enable the cover to move from side-to-side or up-and-down across the bearing surface of the deformable body upon exertion of a localized impact, such as a shear force. This function of the deformable body 702 and the movable cover 704 may be in addition to the shock absorbing function of the deformable body 702 and cover described 704 above in connection with the first through fifth implementations. Thus, in addition absorbing and distributing an impact across the cover 704 and the deformable body 702 so that a localized force may be spread out over a larger surface area of the luggage piece 100, the protective system 700 of the sixth implementation may enable forces to be deflected away from the luggage piece 100 by movement of the cover 704 against the elastic force of the attachment legs 706. The deflection motion of the cover 704 may enable the luggage piece 100 or the object contacting the luggage piece 100 to slide away or off the luggage piece 100, which may prevent at least a portion of the impact from being received by the protective system 700 and/or the luggage piece 100.

Figure 8A:
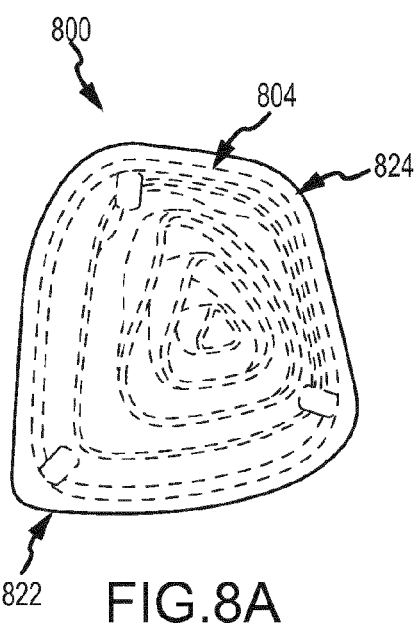
FIGS. 8A-8B show a front perspective view and a rear perspective view, respectively, of a protective system according to a seventh implementation.
Figure 8B:
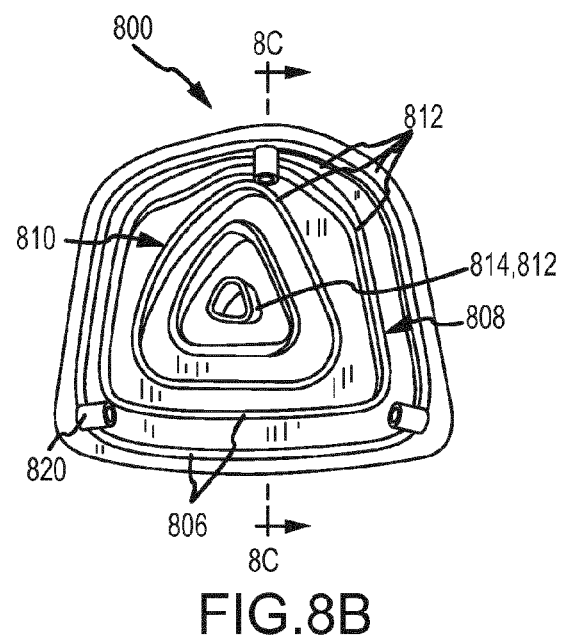
Figure 8C:
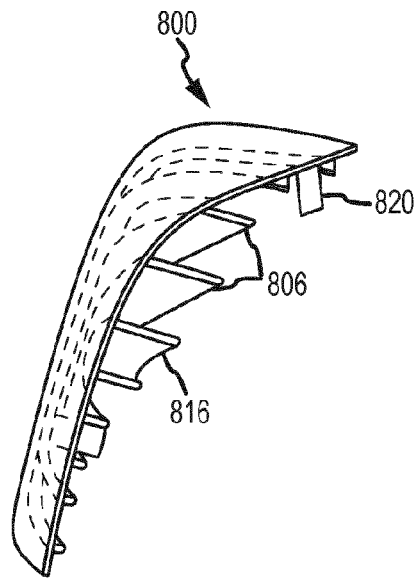
FIG. 8C shows a cross-sectional view of the seventh protective system of FIGS. 8A-8B, viewed along line 8C-8C in FIG. 8B.
Figure 8D:
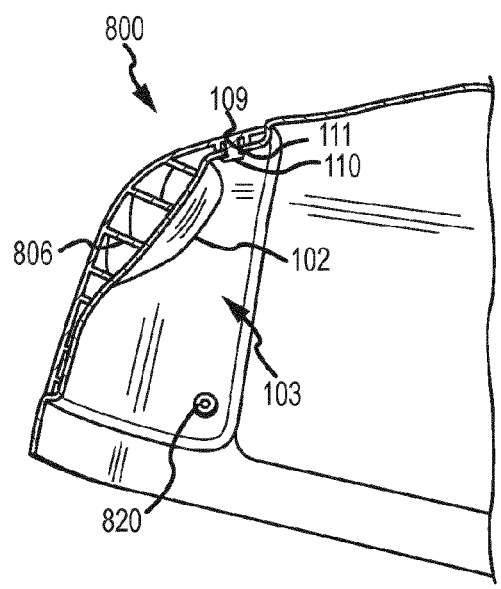
FIG. 8D shows a partial cross-sectional view of the luggage piece of FIGS. 1A-1E, viewed along line A-A in FIG. 1 and incorporating the protective system of the seventh implementation of FIGS. 8A-8C.

FIGS. 8A-8C show a front perspective view, a rear perspective view and a cross-sectional view, respectively, of the protective system 800 according to the seventh implementation. The protective system 800 of the seventh implementation may provide an exterior shape similar to the shape of a rounded corner of a luggage piece and an interior shape that is complementary to the indented corner region of the shell of the luggage piece (see FIG. 8D). This protective system 800 may include a cover 804 with ribs 806 protruding from the interior surface 808 of the cover. The ribs 806 may extend towards the indented corner region 103 of the shell of the luggage piece 100 when assembled. The cover 804 and the ribs 806 may be formed of a unitary piece through an injection molding process and may be formed of a flexible material such, as polyurethane, which may deform upon impact and return to its original shape thereafter. However, in some implementations, the cover 804 and/or the ribs 806 may be rigid.

The ribs 806 extending from the cover interior 808 form a honeycomb structure 810. For example, each rib 806 may form a continuous wall 812 that successively encloses another continuous wall up to a center rib 814, also forming a central continuous wall 812. The terminal ends 816 of the continuous walls 812 contact or are adjacent to the shell exterior 101 and are configured for deforming, e.g., bending, and contacting the shell exterior 101 at the indented corner region 106 upon impact. The size and shape of the ribs 806 or the continuous walls 812 may be based on providing larger, thicker or more robust walls in areas that generally receive larger or more frequent impacts from an external force, and smaller or thinner walls in areas that generally receive smaller or fewer impacts. The size and shape of the ribs 806, walls 812 as well as the cover 804 may also be based on a selection for an area where the external forces are to be transmitted and absorbed by the protective system.

The cover 804 with its ribs 806 may also include cover bosses 820 at the corner regions 822. The cover bosses 820 may extend towards the shell exterior 101 of the luggage piece 100 and pass into through bores 109 formed in the luggage piece 100. Protective system fasteners 110 extending through the shell interior 102 and into the cover boss 820 may fasten the protective system 800 to the luggage piece 100. As described in more detail above, each cover boss 820 and respective protective system fastener 110 may be secured to each other by any suitable connection method or system. In addition, a deformable boss 111 may be provided between the cover boss 820 and the shell bore, between the protective system fastener 110 and the shell bore 109 or both.

As described above, the cover 804 with ribs 806 of the seventh implementation may be configured to deform, contact or otherwise engage the shell exterior 101 upon receiving an impact. The localized force at a cover exterior 824 may be transmitted across the cover exterior 824 and along the length of the ribs 806 forming the continuous walls 812 where the continuous walls 812 deform, e.g., bend or crush inwardly towards the luggage piece, to absorb the received force. In some implementations, the cover 804 may also deform upon receiving the impact. Any remaining force not absorbed may be transmitted to the terminal walls 816 of the continuous walls 812 (e.g., the ribs 806) and onto the shell exterior 101 at the indented corner region 103 of the luggage piece 100. The relatively large surface area of the continuous terminal walls 816 compared to a localized area receiving the impact at the cover exterior 824 may enable the force to be distributed over a relatively larger surface area, which may lessen the chances of damage to the luggage piece 100 or its contents.

Although the cover 804 with ribs 806 forming continuous walls 812 is provided as an implementation without a deformable body, a deformable body may be included, for example, in an area proximate the cover 804, between the cover 804 and the ribs 806, proximate the ribs 806, between the ribs 806, proximate the terminal end walls 816, and/or between the terminal end walls 816 and the shell exterior 101 at the indented corner region 103 of the luggage piece 100.

Figure 9A:
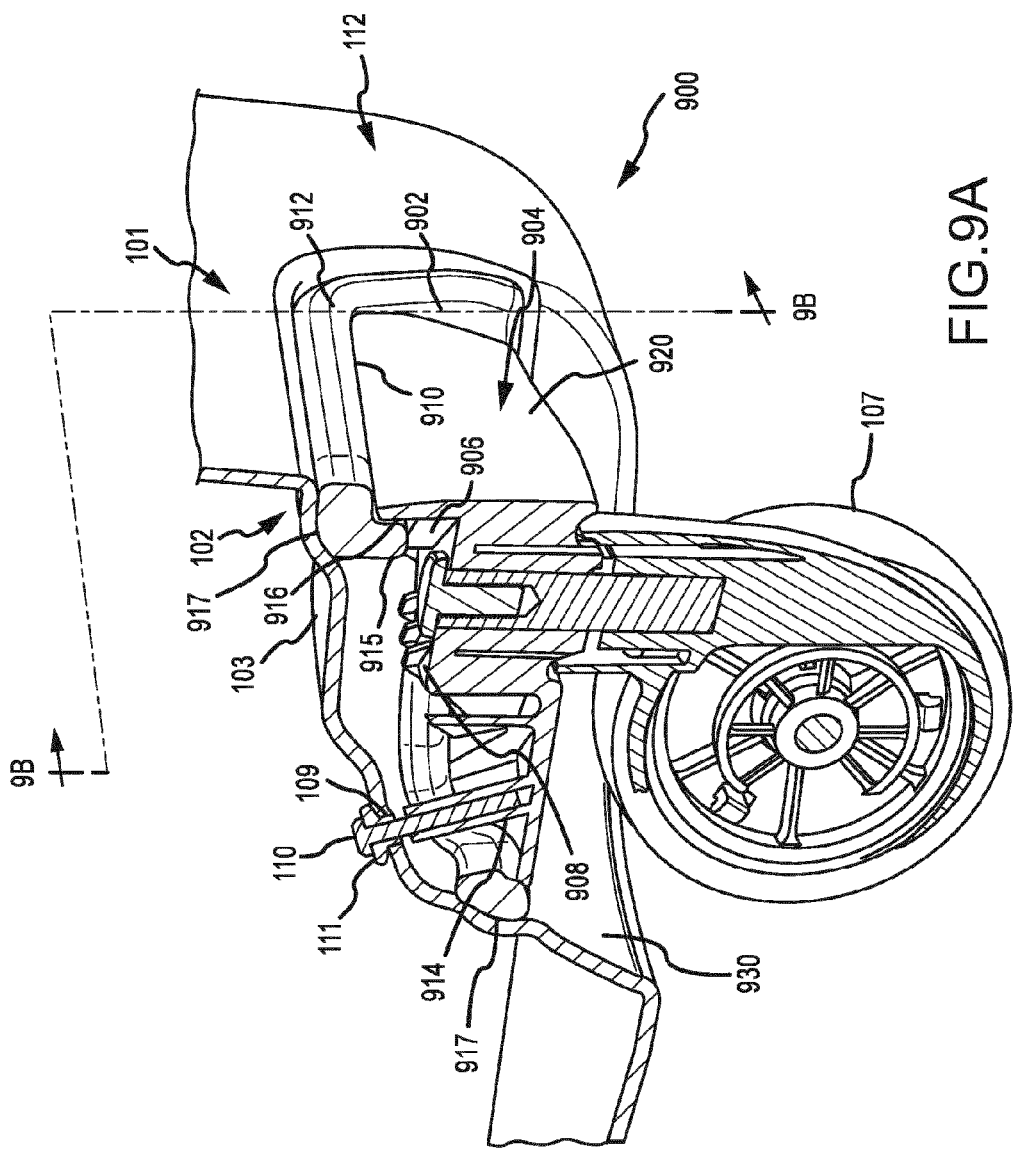
FIG. 9A shows a partial cross-sectional view of the luggage piece of FIGS. 1A-1E, viewed along line 9A-9A in FIG. 1 and incorporating a protective system according to an eighth implementation.
Figure 9B:
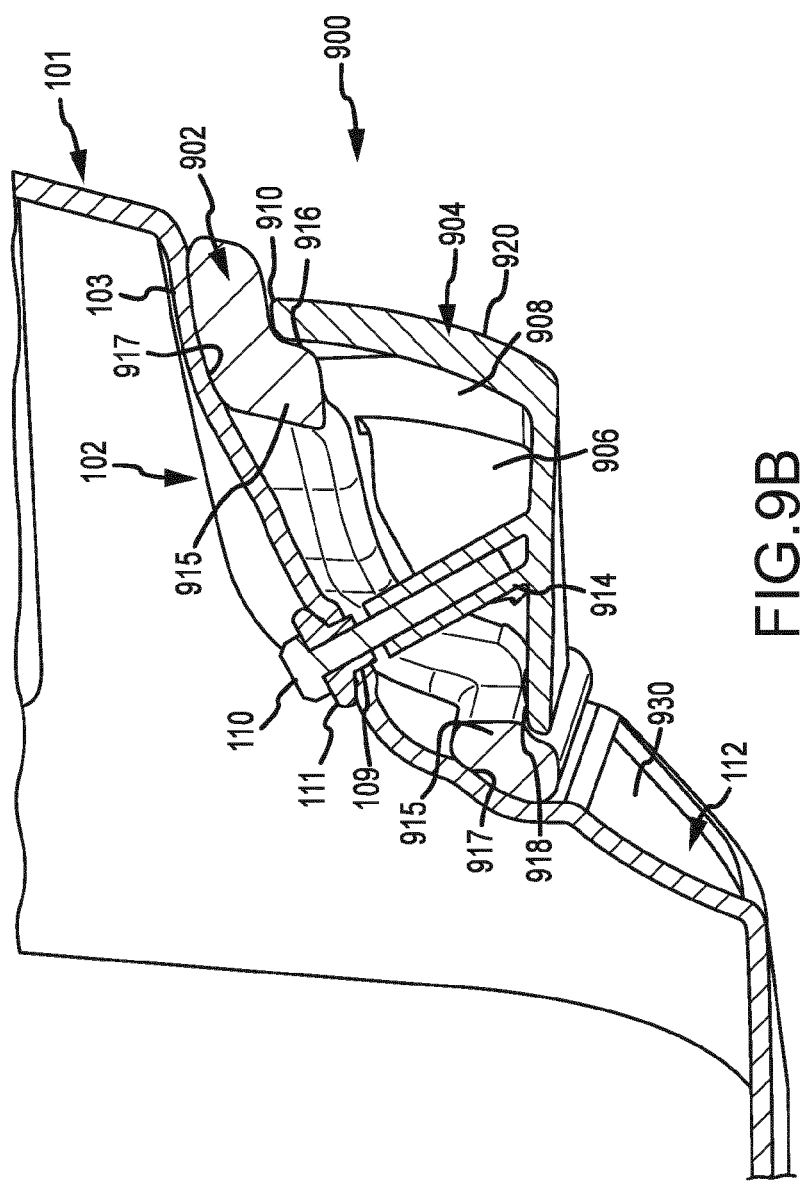
FIG. 9B shows another partial cross-sectional view of the luggage piece of FIG. 9A, viewed along line 9B-9B in FIG. 9A.

FIGS. 9A and 9B show cross-sectional views of a protective system 900 with a deformable body 902 and a cover 904 according to the eighth implementation. The protective system 900 may include a deformable body 902 and a cover 904 that may include ribs 906 protruding from the interior surface 908 of the cover, which may be similar to the protective system 800 of the seventh implementation including the cover 804 with ribs 806. In FIG. 9A, the protective system 900 is provided as an assembly with a wheel 107 secured to the cover 904 by any suitable connection method or system.

The deformable body 902 may be formed with a rounded triangular shape or another shape that may extend beyond a peripheral rim 910 of the cover 904 as shown in FIG. 9A. The deformable body exterior 912 may form a central opening or aperture, which makes the deformable body 902 function substantially like a grommet. The central opening of the deformable body 902 may be sized and shaped to receive a portion of the protective system 900, such as the ribs 906 and bosses 914 of the cover 904, a portion of the luggage piece 100, such as a portion of the indented corner region 103, a portion of the fasteners 110, the deformable bosses 111 and combinations thereof. A flange or rim 915 on the internal periphery of the deformable body 902 defines a shoulder (also referred to as a recessed area) 916 of the deformable body exterior 912 complementary to the peripheral rim 910, which may serve to position the cover 904 on the deformable body exterior 912 and provide cushioning thereto. A portion 917 of the deformable body exterior 912 facing the luggage piece 100 may be sized and shaped complementary to a portion of the indented corner region 103 to be seated in the region 103. This portion 917 may mate with the walls of the recess 103 around the entire periphery of the deformable body to provide cushioning around the entire periphery of the cover 904. The deformable body 902 may include bores for receiving cover bosses 914, the cover bosses 914 may extend through the central opening of the deformable body 902 or both.

In some implementations, the deformable body 902 may form a friction fit with the cover 904, and upon joining the protective system 900 to the luggage piece 100, described below, the deformable body 902 may be securely held between the luggage piece 100 and the cover 904. Alternatively, the cover 904 may include bosses (not shown) that may be used to join the deformable body 902 and the cover 904 by any suitable connection method or system.

The protective system 900 may join to luggage piece 100 using protective system fasteners 110 inserted through the shell interior 102 via the shell bores 109 and into the receiving cover bosses 914. In some implementations, a deformable boss 111 may be provided between the protective system fastener 110 and the shell bore 109. A portion of the deformable boss 111 may be slightly spaced from a terminal end surface of the receiving cover boss 914, which may provide for additional force absorption and transmission, described below.

A localized force at cover exterior 920 may be transmitted across the cover exterior 920 and along the length of the ribs 906 to absorb the received force such as in the manner discussed above in connection with the protective system 800. In some implementations, the cover 904 may deform upon receiving the impact. Any remaining force not absorbed may be transmitted to the deformable body 902, to the shell exterior 101 or both. For example, forces transmitted to the periphery 910 of the cover 904 may be absorbed by the deformable body 902, while forces transmitted along the ribs 906 extending through the central opening of the deformable body 902 may be absorbed by the shell exterior 101 and forces transmitted along the ribs 906 contacting the deformable body 902 may be absorbed by the deformable body 902. As the deformable body absorbs forces, any remaining force not absorbed may be transmitted to the shell exterior 101. When forces are transmitted to the shell interior 102 in an area proximate the shell bore 109, the deformable boss 111 may absorb and distribute impact forces. For example, upon the cover 904 receiving a localized force, the receiving cover boss 914 of the cover 904 may be forced towards and in contact with the a facing end of the deformable boss 111. In this example, the deformable boss 111 may absorb and transmit the impact forces from the receiving cover boss 914, which may lessen chances of damage to the luggage piece 100, such as at the indented corner region 103 in areas surrounding the shell bore 109. In another example, forces exerted on the protective system 900 by virtue of the wheel 107 rolling or spinning may be transmitted throughout the protective system 900, and some forces may be transmitted from the receiving cover boss 914 to the deformable boss 111. By absorbing and transmitting forces across the protective system 900, which may include the deformable body 902, the cover 904, the deformable boss 111, and combinations thereof, sounds generated by the wheels 107 rolling over rough surfaces, for example, may be absorbed or reduced. Any undesirable vibration of the luggage case that may be caused by vibration of the wheel 107 rolling over rough or uneven surfaces may also be reduced. Accordingly, the luggage piece may travel in a quiet and stable manner even on uneven surfaces.

FIG. 10A shows a bottom perspective view of a protective system 1000 according to the ninth implementation joined to the shell of a luggage piece. The protective system 1000 may include a deformable body 1002 and a cover 1004, which may be similar to the cover 904 of the protective system of the eighth implementation. Similar to the protective system 900 of the eighth implementation, the protective system 1000 of the ninth implementation may be provided as an assembly with a wheel 1007 secured to the cover 1004 by many suitable connection mechanisms, such as that shown in FIG. 10D. Accordingly, the corner of the luggage piece, to which the protective systems 1000 according to the ninth implementation may be coupled to, may form a recess or an indented region that defines in general a concave base wall (also referred to as an exterior surface) 1030 with varying contours (see, for example, FIG. 10D) to accommodate the wheel assembly 1007. In contrast, the recess formed in the corner 104 of the luggage piece, to which the protective systems 200, 300, 400, 500, 600, 700, 800 according to the first to seventh implementations may be coupled to, include a base wall having a mostly convex surface within the. See, for example, FIGS. 2C-2E, 3C-3D, 4C-4E, 6C, 6D, 8C and 8D. In some of these earlier implementations, a portion of the base wall or surface inside the recess may be partially concave to accommodate specific structures of the particular protective systems (see, for example, FIGS. 4C-4E, 8C and 8D).

With reference to FIGS. 10A and 10D, the cover 1004 may include an exterior surface 1006 and an interior surface 1008. The interior surface 1008 of the cover 1004 may include ribs 1010 formed thereon for improved strength. In some examples, the ribs 1010 may further include deformable terminal ends similar to those of the protective systems 800, 900 according to the seventh and eighth implementations. The ribs 1010 may form continuous walls extending around on the interior surface 1008, or they may form discrete segments. The interior surface 1008 may further include boss structures 1012 formed thereon to receive fasteners 1014 for joining the cover 1004 to the luggage case. The exterior surface 1006 of the cover 1004 may include in general a planar bottom portion 1016 that defines in general a rectilinear shape. Other suitable shapes, such as but not limited to triangular, circular shapes, may be contemplated.

Continuing with FIGS. 10A and 10D, the exterior surface 1006 may further include side or wall portion 1018 extending upward from two sides of the rectilinear shape that are further away from an interior compartment of the luggage piece. The side or wall portion 1018 and the planar bottom portion 1016 may collectively define a three dimensional peripheral edge or rim including an upper peripheral edge or rim portion 1020 of the side or wall portion 1018 in an upper plane, a lower peripheral edge or rim portion 1022 of the bottom planar portion 1016 (opposing the upper peripheral edge or rim portion of the side portion 1020) in an lower plane, and two middle peripheral edge or rim portions 1024 joining respective terminal ends of the upper and lower L-shapes. The peripheral edge and rim portions 1020, 1022, 1024 collectively define a mating surface of the cover 1004 to a recess 1048 of the deformable body 1002 as described below.

The cover 1004 may further include an aperture 1026 formed in the bottom planar portion 1016 to receive mechanisms, such as a fastener 1028 and a rotating shaft 1032, for joining the wheel assembly 1007 to the luggage case.

With reference to FIGS. 10A, 10B, 10C, and 10D, the deformable body 1002 may define in general a rectilinear shape with rounded corners, when viewed from the top or the bottom. Other suitable shapes for the deformable body 1002 including, but not limited to, circular, triangle, may be contemplated. Two adjacent sides of the rectilinear shape that are closer to an interior compartment of the luggage piece may further include downward extending side portions 1038 (see, for instance, FIG. 10B) forming in general an L-shape. Accordingly, the deformable body 1002 may define a three dimensional rectilinear-shaped peripheral edge or rim including an upper L-shaped peripheral edge or rim portion 1040 in an upper plane, a lower L-shaped peripheral edge or rim portion 1042 (opposing the upper L-shaped peripheral edge or rim portion 1040) in an lower plane, and two middle peripheral edge or rim portions 1044 joining respective terminal ends of the upper and lower L-shapes. The three dimensional rectilinear shaped peripheral edge or rim portions 1040, 1042, 1044 of the deformable body 1002 may extend beyond the peripheral edge or rim portions 1020, 1022, 1024. Additionally, the peripheral edge or rim portions 1040, 1042, 1044 of the deformable body 1002 may be flush with the adjacent luggage case exterior surface.

In continuing reference to FIGS. 10A, 10B, 100, and 10D, the deformable body 1002 may include an interior surface 1034 conforming or complementary to the shape of the corner recess 1003 (FIG. 10D) and an exterior surface 1036 similar to the interior profile of the cover 1004 coupled thereto. A space may be formed between the exterior surface 1036 of the deformable body 1002 and the terminal ends of the ribs 1010 of the cover 1004. Alternatively, the exterior surface 1036 of the deformable body 1002 may contact the terminal ends of the ribs 1010 of the cover 1004.

The deformable body 1002 may further include a recess 1048 formed at the exterior surface 1036 of the deformable body 1002 adjacent the peripheral edge or rim portions 1040, 1042, 1044 thereof. The recess 1048 may define two surfaces, a flange 1050 being complementary or conforming to the peripheral edge or rim portions 1020, 1022, 1024 of the cover 1004 and a wall 1052 being complementary or conforming to portions of the interior surface 1008 of the cover 1004 adjacent to the peripheral edge or rim portions 1020, 1022, 1024. Accordingly, the peripheral edge or rim portions 1020, 1022, 1024 and the adjacent interior portions of the cover 1004 may be seated within the recess 1048, and the flange 1050 of the deformable body 1002 surrounds the peripheral edge or rim portions 1020, 1022, 1024. The deformable body 1002 may form a friction fit with the cover 1004 upon joining the protective system 1000 to the luggage piece. The deformable body 1002 may further include apertures 1054 formed therein for passing through fasteners 1014 for joining the protective system 1000 to the luggage piece.

The protective system 1000 may be joined to the luggage case in a manner the same as or similar to that described above with respect to the attachment of the protective system 900 to the luggage case according to the eighth implementation. Fasteners 1014 may be positioned through apertures 1056 formed at the corner region of the luggage case and apertures 1054 formed in the deformable body 1002, and received in the boss structures 1012 of the cover 1004 for joining the protective system 1000 to the luggage piece. A deformable boss 1111 may be positioned between the fasteners 1014 and the apertures 1056 of the luggage case. Please note that various fasteners, apertures and boss structures described herein are examples for joining the deformable body to the luggage piece. The deformable body and/or the protective system may be joined to the luggage piece using many other suitable connection mechanisms including, but not limited to, stitches, rivets, snaps, adhesives, welds and so on.

The protective system 1000 according to the ninth implementation may absorb external forces or impact and reduce sounds and/or vibrations generated by the rolling wheel assembly 1007 in a manner similar to that described above with respect to the protective system 900 of the eighth implementation. In addition, the central portion of the deformable body 1002 of the ninth implementation may provide additional protection to the luggage piece by absorbing and distributing any impact forces transmitted from the ribs 1010 of the cover 1004. Furthermore, the protective system 900, 1000 according to both the eighth and ninth implementations may prevent contaminants, such as moisture or dust, from getting inside the wheel assembly 1007 thereby potentially prolonging the service time of the wheel assembly 1007.

The protective systems may be joined to the luggage piece in various ways as described above. In addition, joining the protective systems to the luggage piece may include partially inserting the protective bosses within the shell interior and inserting protective system fasteners into the bosses at the shell interior or aligning the protective system bosses with bores of the luggage piece at the shell exterior and inserting protective system fasteners through the bores to join with the bosses at the shell exterior. In addition, some of the bosses of the protective system may join to the luggage piece at the shell exterior, while other bosses of the protective system may be inserted through the bores into the interior for joining to the luggage piece. In areas where the protective systems join to the luggage piece, deformable bosses may be provided for absorbing and distributing impact forces exerted between joined components (e.g., between connecting systems and the shell). While the protective systems are described as joining to the luggage piece by way of the indented corner region, the protective systems may join to the luggage piece at other areas of the luggage piece, such as at the exterior shell, along the side edge, and/or top side edge.

The deformable body (e.g., 202 and other examples described herein) provided by the protective systems e.g. 200 described herein) according to the implementations provided herein, generally absorbs impacts (e.g., normal, perpendicular forces and shear, parallel or tangential forces) from luggage piece handling, such as during transport, and serves as a cushion between the cover, if present, and the shell forming the luggage piece. The deformable body also dampens the impacts by transmitting any remaining, non-absorbed forces, across the deformable body. For example, the deformable body exterior receives impact forces that are at least partially absorbed by the deformable body layer and any remaining impact forces are transmitted throughout the deformable body layer to the deformable body interior that is coupled to the shell exterior of the luggage piece. The deformable body located at the exterior of the luggage piece thus permits a relatively localized impact force to be absorbed and distributed across the deformable body so that the shell exterior receives the impact across a relatively larger surface area, e.g., across the indented corner region, areas proximate the indented corner region, or at the luggage piece generally, thereby helping protect the luggage piece from damage due to high impact, localized forces.

The deformable body may be formed of one or more layers of deformable, impact absorbing material such as foams; gels; visco-elastic materials (e.g., materials that exhibit viscous and elastic properties that may absorb energy, undergo stress relaxation, creep and recover) including visco-elastic polymers (e.g., amorphous polymers and semi-crystalline polymers); ethylene-vinyl acetate ("EVA"); expanded polypropylene ("EPP"); foamed thermoplastic elastomer ("TPE"); and/or foamed polyurethane. The deformable body may have a substantially constant thickness or may include regions having relatively more or less thickness. The deformable body may also have the same or varying densities within each protective system or among several protective systems provided on the luggage piece. In one example, the deformable body has a thickness of between about 5-10 mm. In another example, the deformable body of the protective systems disposed on high impact areas of the luggage piece, e.g., at the bottom corners, may have a higher density and be configured to absorb higher or more frequent impacts compared to the deformable body of the protective systems disposed on relatively lower impact areas of the luggage piece, e.g., at the top corners proximate the retractable handle. The deformable body may be a substantially continuous body or may define openings, e.g., may be shaped as a grommet. The deformable body of the protective systems may be exposed or hidden from the exterior of the luggage piece, e.g., hidden by a cover. The deformable body may include surface structures such recessed areas, protrusions, textures, bores, and the like.

The cover (e.g., cover 204) may serve as a generally rigid impact layer that may provide strength to the protective system. The cover may facilitate absorbing impacts at the deformable body by transmitting forces across the cover and onto the deformable body so as to distribute a localized force received at an exterior of the cover to a larger surface area on an interior surface of the cover, and then to the exterior surface of the coupled deformable body. In addition, or alternatively, the cover or portions thereof, may serve as a pliable or flexible layer (e.g., cover 504) that deflects into the underlying deformable body upon impact so that the deformable body may absorb the impact in the originating area of the localized force. The cover (rigid and/or pliable) may be formed with a thickness that is substantially the same or may be formed of a varying thickness.

A rigid cover may be formed of one or more rigid layers of polycarbonate ("PC"); polyamide or polyacetate ("PA"); polycarbonate/acrylonitrile butadiene styrene ("PC/ABS"); polyurethane ("PU"); thermoplastic polyurethane ("TPU"); thermoplastic elastomer ("TPE"); and/or ethylene-vinyl acetate ("EVA"). A pliable or deformable cover may be formed of a thermoset plastic such as Elastoskin®, i.e., an aromatic-isocyanate-based plastic that is a thermoset plastic providing a layer having a soft cover or leather-like feel, which resists cracking over a wide temperature range, or an aliphatic-isocyanate-based spray polyurethane cover formed by a spray or reaction injection molding processes. The pliable cover may also be formed of the rigid cover materials but may be provided with a composition that forms a foamed, pliable or a flexible cover. The cover may be formed with a thickness that is between about 1.0 mm and 1.5 mm. The cover, when utilized with a deformable body, may be coupled to the deformable body by gluing, injection molding, over-molding, laminating, or utilizing mechanical fastening devices such as threaded screws or boss and fastener arrangements.

While the protective systems are described as used with a luggage piece configured as a suitcase, the protective systems could be used with any type of luggage or with backpacks or other bags. The structures and functions of the first through seventh implementations may be used interchangeably to form alternative implementations, as would be appreciated by those skilled the art.

All directional references (e.g., upper, lower, upward, downward, left, right, leftward, rightward, inner, outer, interior, exterior, top, bottom, above, below, vertical, horizontal, clockwise, and counterclockwise) are only used for identification purposes to aid the reader's understanding of the implementations of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components that terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A protective system for a luggage piece, comprising:
a deformable body comprising a first surface and a second surface, the first surface at least partially complementary to and abutting a first recess integrally formed in an exterior surface of a substantially rigid outer structure of the luggage piece and joined to the luggage piece when positioned at least partially in the recess; and
a cover overlying and coupled with the deformable body, the cover being more rigid than the deformable body; wherein:
the periphery of the deformable body is greater than the periphery of the cover;
the deformable body comprises at least one aperture;
at least one fastener is positioned through the at least one aperture of the deformable body;
external impacts exerted on the cover are transmitted across the cover such that the forces associated with such external impacts are exerted on the deformable body and are at least partially absorbed by the deformable body;

the cover includes at least one spinner wheel; and the second surface defines a second recess for the cover and the cover abuts the second recess.

2. The protective system according to claim 1, wherein the deformable body absorbs forces impacting the at least one spinner wheel.

3. The protective system according to claim 1, wherein the deformable body comprises at least one of a foam, a gel, a visco-elastic material or an elastic material.

4. The protective system according to claim 1, wherein the luggage piece comprises at least one corner region, the recess being formed at the at least one corner region, and a base wall of the recess defines in general a concave or convex exterior surface shape.

5. The protective system according to claim 4, wherein the protective system absorbs an amount of sound and/or vibration produced by the at least one caster wheel.

6. The protective system according to claim 1, wherein the deformable body comprises an exterior shape complementary to a periphery of the cover.

7. The protective system according to claim 6, wherein the exterior shape of the deformable body defines a recess for receiving a peripheral edge portion of the cover.

8. The protective system according to claim 6, wherein the deformable body operably forms a friction fit between the recess of the exterior surface of the luggage piece and the periphery of the cover.

9. The protective system according to claim 1,
wherein:
the at least one fastener is configured to join the deformable body within the recess of the luggage piece.

10. The protective system according to claim 9, wherein the luggage piece is configured with at least one aperture formed within the recess, and at least one deformable boss is configured to operably engage the at least one aperture of the luggage piece formed within the recess.

11. The protective system according to claim 10, wherein the at least one deformable boss is configured to receive the at least one fastener positioned through the at least one aperture of the deformable body.

12. The protective system according to claim 11, wherein the at least one deformable boss is positioned between the aperture formed in the luggage piece in the recess and the at least one fastener, and is configured to absorb impacts transmitted from the at least one fastener.

13. The protective system according to claim 10, further comprising at least one attachment leg joining the cover to the deformable body, wherein the attachment legs extend from an attachment structure coupled to the deformable body.

14. The protective system according to claim 1, wherein the cover further comprises an interior surface defining a plurality of protruding structures from the interior surface of the cover extending toward the recess of the exterior surface of the luggage piece.

15. The protective system according to claim 14, wherein at least one of the plurality of protruding structures includes a deformable terminal end adjacent to or in contact with the exterior surface of the luggage piece and within the recess, and the deformable terminal end is configured to absorb external impacts exerted on the cover by deforming.

16. The protective system according to claim 1, wherein the deformable body includes an exterior surface forming a recess; and the cover is received within the recess formed in the deformable body.

17. The protective system according to claim 16, wherein the deformable body further includes a thickness wherein at least one region is relatively thicker than surrounding regions of the deformable body.

18. The protective system according to claim 1, wherein the cover includes a thin portion, and external impacts exerted on the thin portion cause the thin portion to deflect inwardly into the deformable body.

19. The protective system according to claim 1, wherein the cover includes anchors extending from an interior surface of the cover and are configured to join with the deformable body.

20. The protective system according to claim 1, further comprising a frame surrounding the deformable body, wherein the frame forms a connection structure for connecting the deformable body to the exterior surface of the luggage piece.

21. The protective system according to claim 1, further comprising a pliable cover overlying and coupled to the deformable body, wherein external impacts exerted on the pliable cover cause the pliable cover to deflect inwardly into the deformable body.

22. The protective system according to claim 1, the cover comprises a rigid cover overlying and movably coupled to the deformable body, wherein external impacts exerted on the rigid cover are transmitted across the cover such that forces associated with the external impacts cause the rigid cover to move along an exterior surface of the deformable body.

* * * * *